(12) United States Patent
Yamamoto et al.

(10) Patent No.: US 10,435,844 B2
(45) Date of Patent: Oct. 8, 2019

(54) SILICONE COMPOSITION FOR RELEASE PAPER OR RELEASE FILM, RELEASE PAPER, AND RELEASE FILM

(71) Applicant: SHIN-ETSU CHEMICAL CO., LTD., Tokyo (JP)

(72) Inventors: Kenji Yamamoto, Annaka (JP); Hayato Onozawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 73 days.

(21) Appl. No.: 15/580,588

(22) PCT Filed: May 19, 2016

(86) PCT No.: PCT/JP2016/064891
§ 371 (c)(1),
(2) Date: Dec. 7, 2017

(87) PCT Pub. No.: WO2016/199561
PCT Pub. Date: Dec. 15, 2016

(65) Prior Publication Data
US 2018/0155877 A1 Jun. 7, 2018

(30) Foreign Application Priority Data

Jun. 8, 2015 (JP) ................................. 2015-115993

(51) Int. Cl.
*D21H 27/00* (2006.01)
*D21H 19/32* (2006.01)
*B32B 27/28* (2006.01)
*C09J 183/04* (2006.01)
*C09D 183/04* (2006.01)
*C08G 77/12* (2006.01)
*C08G 77/20* (2006.01)

(52) U.S. Cl.
CPC ......... *D21H 27/001* (2013.01); *B32B 27/283* (2013.01); *C09D 183/04* (2013.01); *C09J 183/04* (2013.01); *D21H 19/32* (2013.01); *D21H 27/00* (2013.01); *C08G 77/12* (2013.01); *C08G 77/20* (2013.01); *C08L 2205/025* (2013.01); *C09J 2483/005* (2013.01)

(58) Field of Classification Search
CPC ...... D21H 27/00; D21H 27/001; D21H 19/32; C09D 183/04; C09J 183/04; C09J 2483/005; B32B 27/283; C08L 2205/025; C08G 77/12; C08G 77/20
See application file for complete search history.

(56) References Cited

U.S. PATENT DOCUMENTS

| 4,609,574 A | 9/1986 | Keryk et al. |
| 4,772,515 A | 9/1988 | Hara et al. |
| 5,468,824 A * | 11/1995 | Togashi ............... C09D 183/04 528/12 |
| 5,932,060 A | 8/1999 | O'Brien et al. |
| 5,942,591 A | 8/1999 | Itoh et al. |
| 6,562,469 B2 * | 5/2003 | Koyama .................. C08K 5/02 428/447 |
| 2007/0129507 A1 | 6/2007 | Irifune |
| 2013/0330562 A1 | 12/2013 | Irifune et al. |

FOREIGN PATENT DOCUMENTS

| EP | 2 385 084 A1 | 11/2011 |
| EP | 2 444 463 A1 | 4/2012 |
| JP | 50-25644 | 3/1975 |
| JP | 60-190458 A | 9/1985 |
| JP | 62-86061 A | 4/1987 |
| JP | 63-251465 A | 10/1988 |
| JP | 1-215857 A | 8/1989 |
| JP | 3-19267 B2 | 3/1991 |
| JP | 9-78032 A | 3/1997 |
| JP | 11-193366 A | 7/1999 |
| JP | 2003-192987 A | 7/2003 |
| JP | 2007-182552 A | 7/2007 |
| JP | 2011-236289 A | 11/2011 |
| JP | 2012-92165 A | 5/2012 |
| JP | 2012-246359 A | 12/2012 |
| JP | 2013-253176 A | 12/2013 |

OTHER PUBLICATIONS

Extended European Search Report dated Dec. 11, 2018, in European Patent Application No. 16807268.4.
International Search Report for PCT/JP2016/064891 (PCT/ISA/210) dated Jul. 19, 2016.
Written Opinion of the International Searching Authority for PCT/JP2016/064891 (PCT/ISA/237) dated Jul. 19, 2016.

* cited by examiner

*Primary Examiner* — Robert S Jones

(74) *Attorney, Agent, or Firm* — Birch, Stewart, Kolasch & Birch, LLP

(57) ABSTRACT

Provided are: an additive reaction-type silicone composition that is for release paper or for a release film, that is non-migratory, and that exhibits light releasability with respect to various adhesives, said silicone composition for release paper or for a release film making it possible to form a cured film that does not adversely affect residual adhesive strength or releasability; and a release paper or a release film obtained by applying the composition to a substrate and curing the result.

In a silicone composition for release paper or a release film cured by additive reaction, an organopolysiloxane containing an alkenyl group having a terminal unsaturated bond is used as a base polymer, and a specific amount of an organopolysiloxane that has a lower molecular weight than the base polymer and that contains an alkenyl group having a terminal unsaturated bond is mixed with the base polymer.

9 Claims, No Drawings

SILICONE COMPOSITION FOR RELEASE PAPER OR RELEASE FILM, RELEASE PAPER, AND RELEASE FILM

TECHNICAL FIELD

This invention relates to a silicone composition suited for the preparation of release paper or film having improved release properties, and more particularly, to a silicone composition for release paper or film which is applied as a coating that is more curable than prior art compositions, and is coated to form a release paper or film having a coated surface with release properties including non-migratory property and a low release force, and a release paper or film obtained by coating and curing the composition to a substrate.

BACKGROUND ART

The release paper or film is obtained by coating a curable silicone composition as silicone-base release agent to the surface of substrates such as plastic film or paper, and effecting crosslinking reaction to form a cured coating. The resulting coating is widely used as a release agent layer relative to adhesive or pressure-sensitive adhesive (PSA) substances.

Among these curable silicone compositions, silicone compositions of addition reaction type adapted to cure via hydrosilylation reaction are well known, for example, a silicone composition comprising an alkenyl-containing organopolysiloxane, an organohydrogenpolysiloxane, and a platinum base compound, as disclosed in JP-A S62-86061 (Patent Document 1). Since this composition has advantages including a high cure rate, a good pot-life, and widely varying release properties, it is widely used as the silicone release agent.

Under the recent trend of available substrates, the use of plastic film substrates is increasing because of uniform and stable quality, high smoothness, and possible film thickness reduction. The drawback of plastic film substrates is poor heat resistance as compared with paper. Therefore, the heating temperature during formation of a cured coating of silicone composition is limited. Since extremely high temperature curing is prohibited, there has hitherto been a strong demand for an improvement in curing of silicone compositions.

As to paper substrates, a variety of composite substrates having paper combined with plastic materials have been developed for the purpose of imparting a function which is not achievable solely with paper. Not only conventional PE-laminated paper, but also a wide variety of substrates are used. Many composite substrates suffer from heat resistance like plastic film substrates. In addition, there are recently increasing applications where higher performance is required with respect to dimensional stability, processing accuracy, transparency, and reflection properties. There is a strong propensity to avoid the likelihood of deformation and appearance degradation by heating. The demand for improvements in curing of silicone compositions is increasing.

Proposals for improving the cure of silicone compositions were made from the past. As the method for making modifications to the base polymer structure in silicone compositions, for example, JP-A S63-251465, JP-B H03-19267, JP-A H09-78032, and JP-A H11-193366 (Patent Documents 2 to 5) propose to incorporate a branched structure containing $RSiO_{3/2}$ units wherein R is a monovalent hydrocarbon group. Since these methods intend to reduce the release force upon high-speed peeling and to improve cure, the improvement in cure is observable merely as an auxiliary effect.

Also JP-A S60-190458 (Patent Document 6) proposes to change the arrangement and structure of functional groups on a base polymer in a silicone composition. With respect to cure, there is a need for further improvement.

With respect to release properties, on the other hand, cured coatings of silicone compositions receive high reputation from the past. In the recent years, a lighter release is required to comply with improvements in the performance of pressure-sensitive adhesive and adhesive, and diversification of applications. Particularly in the mold parting film application, there is a tendency that the cured coating of silicone composition becomes thinner, indicating a transition toward the situation that fails to take full advantage of the mold parting of the cured coating.

As discussed above, there is not found in the prior art an appropriate method capable of improving the cure of a silicone composition while improving the mold parting of a cured coating thereof. Thus there is a demand for a silicone composition capable of meeting both light release property and high curability.

PRIOR ART DOCUMENTS

Patent Documents

Patent Document 1: JP-A S62-86061
Patent Document 2: JP-A S63-251465
Patent Document 3: JP-B H03-19267
Patent Document 4: JP-A H09-78032
Patent Document 5: JP-A H11-193366
Patent Document 6: JP-A S60-190458

SUMMARY OF THE INVENTION

Problems to be Solved by the Invention

An object of the invention, which has been made under the above-mentioned circumstances, is to provide a release paper or film-forming silicone composition of addition reaction type capable of forming a cured coating which is non-migratory, exhibits light release force relative to various pressure-sensitive adhesives, and does not adversely affect residual bonding force and release force; and a release paper or film obtained by coating and curing the composition to a substrate.

Means for Solving the Problems

Making extensive investigations to attain the above object, the inventors have found that when an organopolysiloxane terminated with an alkenyl group having an unsaturated bond is used as the base polymer, and a specific amount of an organopolysiloxane terminated with an alkenyl group having an unsaturated bond and having a lower molecular weight than the base polymer is blended in a release paper or film-forming silicone composition of addition reaction cure type, there is obtained a release paper or film-forming silicone composition capable of forming an applied coating that exhibits good cure by brief heating, and forming a non-migratory/light release force cured coating without blending a migratory component, and offering a cured coating which does not adversely affect residual bonding force and release force; and that a release paper or film comprising a cured coating of the composition has non-migratory property and light release force. The invention is predicated on this finding.

Accordingly, the invention provides a release paper or film-forming silicone composition and a release paper or film as defined below.

[1] A curable silicone composition of addition cure type for release paper or release film comprising:

(A) 100 parts by weight of an organopolysiloxane containing at least two alkenyl groups per molecule, represented by the general formula (1):

[Chemical Formula 1]

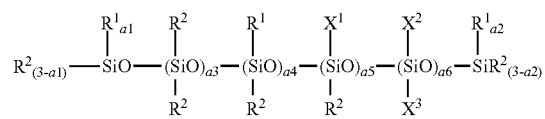
(1)

wherein $R^1$ is independently an alkenyl group, $R^2$ is independently an unsubstituted or halo- or cyano-substituted monovalent hydrocarbon group free of aliphatic unsaturation, $X^1$ is independently a group of the general formula (2-1), $X^2$ is independently a group of the general formula (2-2), $X^3$ is independently a group of the general formula (2-3),

[Chemical Formula 2]

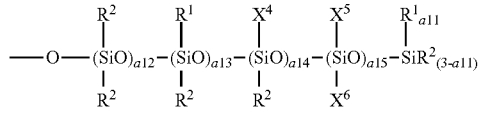
(2-1)

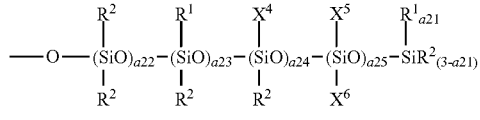
(2-2)

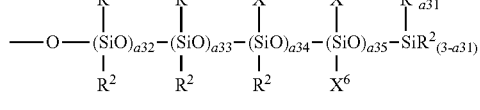
(2-3)

$X^4$ is independently a group of the general formula (3-1), $X^5$ is independently a group of the general formula (3-2), $X^6$ is independently a group of the general formula (3-3),

[Chemical Formula 3]

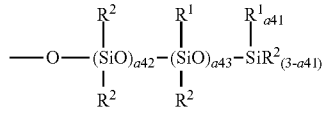
(3-1)

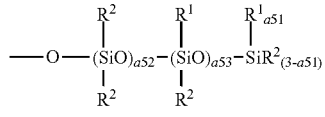
(3-2)

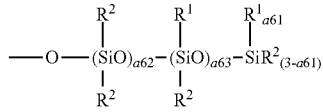
(3-3)

wherein $R^1$ and $R^2$ are as defined above, a1 and a2 each are an integer of 1 to 3, a11, a21, a31, a41, a51, and a61 each are an integer of 0 to 3; a3 is a positive number, a4 to a6, a12 to a15, a22 to a25, a32 to a35, a42, a43, a52, a53, a62 and a63 each are 0 or a positive number, and are selected such that the organopolysiloxane may have a 30 wt % toluene dilution viscosity in the range of 0.01 to 70 Pa·s at 25° C., (B) 0.5 to 20 parts by weight of an organopolysiloxane containing at least two alkenyl groups per molecule, represented by the general formula (4):

[Chemical Formula 4]

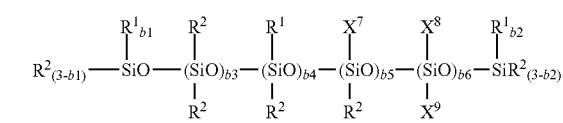
(4)

wherein $R^1$ is independently an alkenyl group, $R^2$ is independently an unsubstituted or halo- or cyano-substituted monovalent hydrocarbon group free of aliphatic unsaturation, $X^7$ is independently a group of the general formula (5-1), $X^8$ is independently a group of the general formula (5-2), $X^9$ is independently a group of the general formula (5-3),

[Chemical Formula 5]

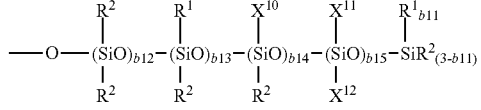
(5-1)

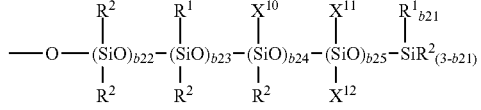
(5-2)

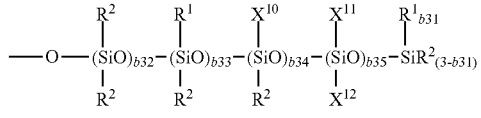
(5-3)

$X^{10}$ is independently a group of the general formula (6-1), $X^{11}$ is independently a group of the general formula (6-2), $X^{12}$ is independently a group of the general formula (6-3),

[Chemical Formula 6]

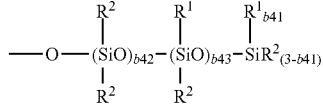
(6-1)

-continued

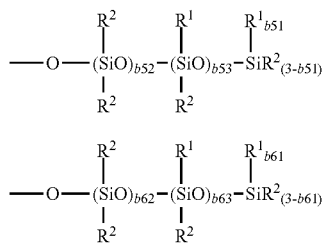

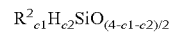

wherein $R^1$ and $R^2$ are as defined above, b1 and b2 each are an integer of 1 to 3, b11, b21, b31, b41, b51, and b61 each are an integer of 0 to 3; b3 is a positive number, b4 to b6, b12 to b15, b22 to b25, b32 to b35, b42, b43, b52, b53, b62, and b63 each are 0 or a positive number, and are selected such that the organopolysiloxane may have a viscosity at 25° C. in the range of 0.005 to less than 1 Pa·s or a 30 wt % toluene dilution viscosity of less than 0.01 Pa·s, and at least four siloxane units not having a silicon-bonded alkenyl group intervene between two siloxane units having a silicon-bonded alkenyl group, (C) an organohydrogenpolysiloxane containing at least two silicon-bonded hydrogen atoms per molecule, represented by the average compositional formula (7), in such an amount that the moles of silicon-bonded hydrogen atoms in component (C) is 0.5 to 10 times the total moles of alkenyl groups and unsaturated groups in components (A) and (B), $$R^2_{c1}H_{c2}SiO_{(4-c1-c2)/2} \quad (7)$$

wherein $R^2$ is independently an unsubstituted or halo- or cyano-substituted monovalent hydrocarbon group free of aliphatic unsaturation, c1 is a positive number of 0.1 to 2, c2 is a positive number of 0.1 to 3, c1+c2 is a positive number of 1 to 3, and selected such that the organohydrogenpolysiloxane may contain at least two silicon-bonded hydrogen atoms per molecule and have a viscosity at 25° C. in the range of 0.005 to 10 Pa·s, (D) a catalytic amount of a platinum group metal base catalyst, and (E) 0 to 100,000 parts by weight of an organic solvent.

[2] The silicone composition of [1] wherein component (C) is an organohydrogenpolysiloxane represented by the general formula (8) and/or (9):

[Chemical Formula 7]

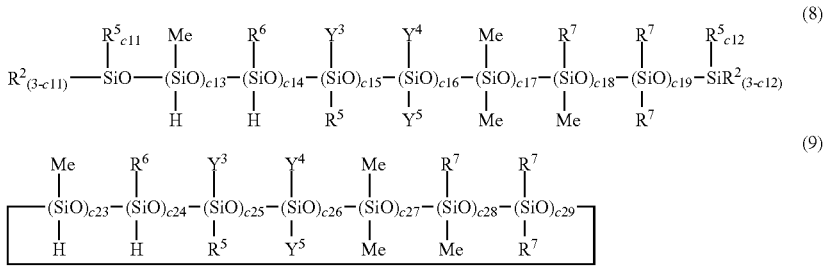

wherein Me is methyl, $R^2$ is independently an unsubstituted or halo- or cyano-substituted monovalent hydrocarbon group free of aliphatic unsaturation, $R^5$ is independently hydrogen or an unsubstituted or halo- or cyano-substituted monovalent hydrocarbon group free of aliphatic unsaturation, $R^6$ and $R^7$ each are an unsubstituted or halo- or cyano-substituted monovalent hydrocarbon group free of aliphatic unsaturation, exclusive of Me, $Y^3$ is independently a group of the general formula (10-1), $Y^4$ is independently a group of the general formula (10-2), $Y^5$ is independently a group of the general formula (10-3),

[Chemical Formula 8]

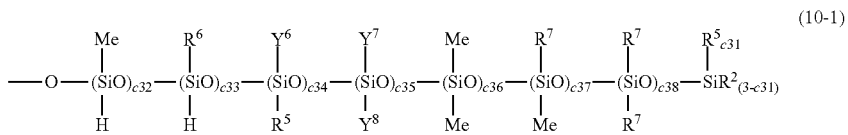

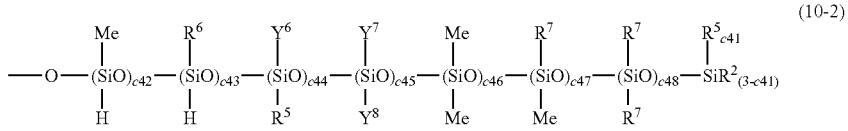

-continued

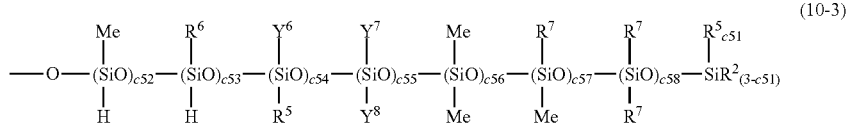
(10-3)

$Y^6$ is independently a group of the general formula (11-1),
$Y^7$ is independently a group of the general formula (11-2),
$Y^8$ is independently a group of the general formula (11-3),

[Chemical Formula 9]

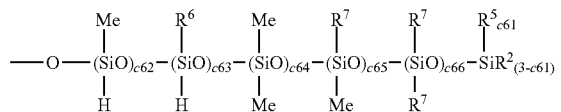
(11-1)

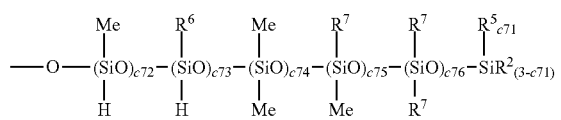
(11-2)

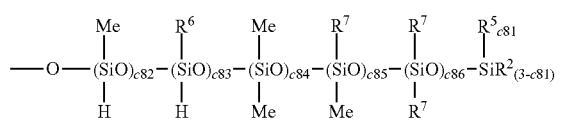
(11-3)

wherein $R^5$, $R^6$ and $R^7$ are as defined above, c11, c12, c31, c41, c51, c61, c71, and c81 each are an integer of 0 to 3, c23 is an integer of at least 2, c13 to c19, c24 to c29, c32 to c38, c42 to c48, c52 to c58, c62 to c66, c72 to c76, and c82 to c86 each are an integer of at least 0, c23+c24+c25+c26+c27+c28+c29 is an integer of at least 3, and are selected such that the organohydrogenpolysiloxane may contain at least three silicon-bonded hydrogen atoms per molecule and have a viscosity at 25° C. in the range of 0.005 to 10 Pa·s.

[3] The silicone composition of [1] or [2] wherein component (C) is an organohydrogenpolysiloxane containing per molecule at least two $R^2{}_2HSiO_{1/2}$ units wherein $R^2$ is an unsubstituted or halo- or cyano-substituted monovalent hydrocarbon group free of aliphatic unsaturation, or a mixture partially containing the organohydrogenpolysiloxane.

[4] The silicone composition of any one of [1] to [3] wherein component (C) is a mixture of (C1) an organohydrogenpolysiloxane free of an aromatic substituent and (C2) an organohydrogenpolysiloxane containing an aromatic substituent wherein a weight ratio (C1)/(C2) of component (C1) to component (C2) is from 1/9 to 9/1.

[5] The silicone composition of any one of [1] to [4], further comprising (F) 0.1 to 30 parts by weight per 100 parts by weight of component (A) of an organopolysiloxane having the general formula (12):

[Chemical Formula 10]

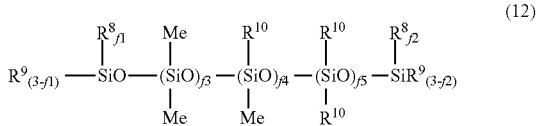
(12)

wherein Me is methyl, $R^8$ is independently a hydroxyl, alkoxy or alkoxyalkyl group, $R^9$ is independently a hydroxyl group, alkoxy group, alkoxyalkyl group, or unsubstituted or halo- or cyano-substituted monovalent hydrocarbon group free of aliphatic unsaturation, $R^{10}$ is independently a hydroxyl group, alkoxy group, alkoxyalkyl group, or unsubstituted or halo- or cyano-substituted monovalent hydrocarbon group free of aliphatic unsaturation, exclusive of Me, f1 and f2 each are an integer of 1 to 3, f3 to f5 are such integers that the organopolysiloxane may have a viscosity at 25° C. in the range of at least 1 Pa·s and a 30 wt % toluene dilution viscosity of up to 100 Pa·s.

[6] The silicone composition of any one of [1] to [5], further comprising (G) 5 to 100 parts by weight per 100 parts by weight of component (A) of an organopolysiloxane having at least two alkenyl groups, essentially comprising $R^2{}_{(3-g1)}R^1{}_{g1}SiO_{1/2}$ siloxane units ($M^{R1R2}$ units) and $R^2SiO_{3/2}$ siloxane units ($T^{R2}$ units) wherein $R^1$ is independently alkenyl, $R^2$ is independently an unsubstituted or halo- or cyano-substituted monovalent hydrocarbon group free of aliphatic unsaturation, and g1 is an integer of 1 to 3, wherein a molar ratio of $M^{R1R2}$ units to $T^{R2}$ units is from 2/8 to 8/2, having a viscosity at 25° C. in the range of 0.001 to 1 Pa·s, and terminated with $M^{R1R2}$ units, or $M^{R1R2}$ units and some silanol or alkoxy groups.

[7] The silicone composition of any one of [1] to [6], further comprising (H) 0.1 to 10 parts by weight per 100 parts by weight of component (A) of an organosilane having at least epoxy and alkoxysilyl groups per molecule, represented by the general formula (13) and/or a partial hydrolytic (co)condensation siloxane thereof, represented by the average compositional formula (14), $$R^{11}{}_{h1}(OR^{12})_{h2}Si(R^{13})_{(4-h1-h2)} \quad (13)$$

$$R^{11}{}_{h3}(OR^{12})_{h4}(R^{13})_{h5}SiO_{(4-h3-h4-h5)/2} \quad (14)$$

wherein $R^{11}$ is an epoxy-containing monovalent organic group, $R^{12}$ is a $C_1$-$C_6$ alkyl group which may contain an ether bond, and which may be partially hydrolyzed into a hydroxyl group, $R^{13}$ is an unsubstituted or halo- or cyano-substituted monovalent hydrocarbon group, h1 and h2 are integers in the range: 1≤h1, 1≤h2, 2≤h1+h2≤4, h3 to h5 are positive numbers in the range: 0<h3, 0<h4, 0≤h5, 1<h3+h4+h5≤3, and are selected such that the partial hydrolytic (co)condensation siloxane may have a viscosity at 25° C. in the range of 0.001 to 1 Pa·s.

[8] The silicone composition of any one of [1] to [7], further comprising (I) 1 to 100 parts by weight per 100 parts by weight of component (A) of a MQ resin consisting of siloxane units (M units) having the general formula (15) and siloxane units (Q units) having the general formula (16) wherein a molar ratio of M units to Q units is from 2/8 to 8/2, $$R^2_{(3-i1)}R^1_{i1}SiO_{1/2} \quad (15)$$

$$SiO_{4/2} \quad (16)$$

wherein $R^1$ is independently an alkenyl group, $R^2$ is independently an unsubstituted or halo- or cyano-substituted monovalent hydrocarbon group free of aliphatic unsaturation, and i1 is an integer of 0 to 3.

[9] A release paper or release film obtained by coating and curing the addition reaction-curable silicone composition of any one of [1] to [8] to a paper or film substrate.

Advantageous Effects of the Invention

The release paper or film-forming silicone composition of the invention is capable of forming an applied coating that exhibits good cure, and forming a cured coating having non-migratory property and light release force. The release paper or film obtained by coating and curing the silicone composition has a light release force relative to various pressure-sensitive adhesives (PSAs), and is non-migratory and satisfactory in residual adhesion.

EMBODIMENT FOR CARRYING OUT THE INVENTION

Now the invention is described in detail. Throughout the specification, Me stands for methyl, Et for ethyl, Ph for phenyl, and Vi for vinyl.

[Release Paper or Film-Forming Silicone Composition]

The release paper or film-forming silicone composition of the invention is a silicone composition of addition cure type comprising components (A) to (D) and optionally components (E) to (I), adapted to cure via addition reaction.

[Component (A)] Base Gum

The addition cure type silicone composition of the invention comprises component (A) which is an organopolysiloxane containing at least two alkenyl groups per molecule and having the structure represented by the general formula (1).

[Chemical Formula 11]

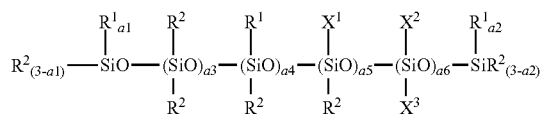
(1)

Herein $R^1$ is independently an alkenyl group, $R^2$ is independently an unsubstituted or halo- or cyano-substituted monovalent hydrocarbon group free of aliphatic unsaturation, $X^1$ is independently a group of the general formula (2-1), $X^2$ is independently a group of the general formula (2-2), and $X^3$ is independently a group of the general formula (2-3).

[Chemical Formula 12]

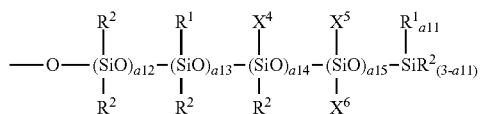
(2-1)

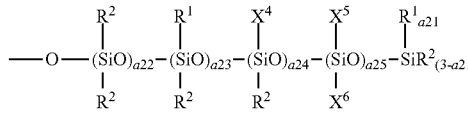
(2-2)

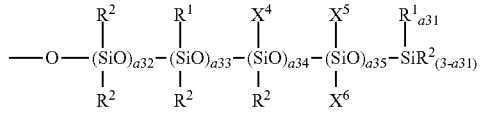
(2-3)

$X^4$ is independently a group of the general formula (3-1), $X^5$ is independently a group of the general formula (3-2), and $X^6$ is independently a group of the general formula (3-3).

[Chemical Formula 13]

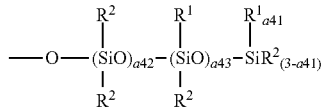
(3-1)

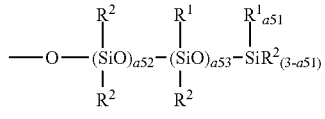
(3-2)

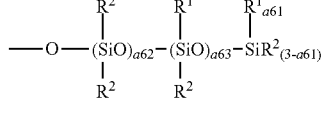
(3-3)

Herein $R^1$ and $R^2$ are as defined above, a1 and a2 each are an integer of 1 to 3, a11, a21, a31, a41, a51, and a61 each are an integer of 0 to 3; a3 is a positive number, a4 to a6, a12 to a15, a22 to a25, a32 to a35, a42, a43, a52, a53, a62 and a63 each are 0 or a positive number, and are selected such that the organopolysiloxane may have a 30 wt % toluene dilution viscosity in the range of 0.01 to 70 Pa·s at 25° C.

In formula (1), $R^1$ which may be identical or different is an alkenyl group of preferably 2 to 10 carbon atoms, more preferably 2 to 8 carbon atoms, such as vinyl, allyl and propenyl. It is industrially preferred that $R^1$ be vinyl.

$R^2$ which may be identical or different is an unsubstituted or substituted monovalent hydrocarbon group free of aliphatic unsaturation, of preferably 1 to 20 carbon atoms, more preferably 1 to 15 carbon atoms, for example, alkyl groups such as methyl, ethyl, propyl and butyl, cycloalkyl groups such as cyclohexyl, aryl groups such as phenyl and tolyl, or substituted forms of the foregoing in which one or more or even all of carbon-bonded hydrogen atoms are substituted by halogen atoms such as fluorine, chlorine and bromine, cyano or the like, such as chloromethyl, trifluoropropyl, and cyanoethyl. It is preferred from the standpoints of preparation and properties that at least 80 mol % of $R^2$ groups be methyl and/or phenyl.

The organopolysiloxane as component (A) contains at least two alkenyl groups per molecule. An organopolysiloxane with less than two alkenyl groups is less curable because of a strong possibility of uncrosslinked molecules being left even after curing. Desirably, the content of alkenyl groups per 100 g of the organopolysiloxane is from 0.0001 mole to less than 0.05 mole, more desirably 0.0002 to 0.03 mole, and even more desirably 0.0002 to 0.01 mole. A content of less than 0.0001 mole may lead to a decline of cure whereas a content of less than 0.05 mole prevents the release force from becoming higher.

In formula (1), parameters are desirably selected such that the number of alkenyl groups per molecule falls in the range of 2 to 300, preferably 2 to 200, more preferably 2 to 100, and even more preferably 2 to 50. In this case, the number of alkenyl groups is calculated from [a1+a2+a4+a5×{a11+a13+a14×(a41+a43)+a15×(a51+a53+a61+a63)}+a6×{a21+a23+a31+a33+(a24+a34)×(a41+a43)+(a25+a35)×(a51+a53+a61+a63)}].

In formula (1), a1 and a2 each are an integer of 1 to 3, a11, a21, a31, a41, a51, and a61 each are an integer of 0 to 3.

Further in formula (1), a3 is a positive number, a4 to a6, a12 to a15, a22 to a25, a32 to a35, a42, a43, a52, a53, a62 and a63 each are 0 or a positive number, and are selected so as to meet the viscosity to be described below.

The organopolysiloxane as component (A) has a viscosity at 25° C. in the range of 0.01 to 70 Pa·s, desirably 0.01 to 60 Pa·s as a 30 wt % toluene dilution viscosity. A 30 wt % toluene dilution viscosity of at least 0.01 Pa·s ensures that the resulting composition is fully applicable whereas a 30 wt % toluene dilution viscosity in excess of 70 Pa·s leads to inefficient working. Preferably the organopolysiloxane itself has a viscosity at 25° C. of at least 1 Pa·s. Notably, the viscosity may be measured by a rotational viscometer (the same holds true hereinafter).

In formula (1), parameters are desirably selected such that the degree of polymerization (DOP) is in the range of 200 to 20,000, preferably 300 to 19,000, more preferably 500 to 15,000. In this case, the DOP is calculated from [2+a3+a4+a5×{2+a12+a13+a14×(2+a42+a43)+a15×(3+a52+a53+a62+a63)}+a6×{3+a22+a23+a32+a33+(a24+a34)×(2+a42+a43)+(a25+a35)×(3+a52+a53+a62+a63)}].

It is noted that the DOP or molecular weight may be determined, for example, versus polystyrene standards by gel permeation chromatography (GPC) using toluene or tetrahydrofuran (THF) as developing solvent. Typically the average DOP is determined as a number average DOP or the like, and the molecular weight is determined as weight average molecular weight (Mw) or the like (the same holds true hereinafter).

The organopolysiloxane as component (A) has a main frame structure which is a linear structure of formula (1) wherein a5 and a6 are 0, or a branched structure of formula (1) wherein a5 and/or a6 is not equal to 0.

When it is desired to have a composition capable of forming a cured coating with a low release force, it is effective and preferable to reduce the values of a4, a13, a23, a33, a43, a53, and a63. By reducing these values, the number of alkenyl groups available per molecule in component (A) is reduced. If a decline of cure is observable as a result thereof, it is preferable as a remedy to introduce a branched structure.

Examples of component (A) are shown below, but not limited thereto.

[Chemical Formula 14]

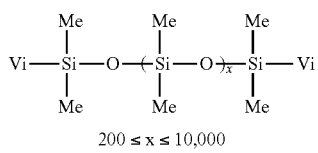

$200 \leq x \leq 10,000$

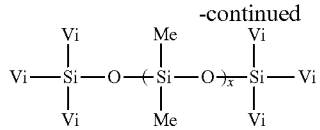

$500 \leq x \leq 15,000$

[Chemical Formula 15]

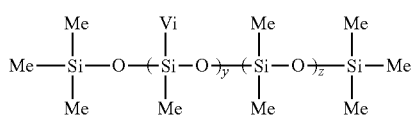

$2 \leq y \leq 200, 200 \leq z \leq 15,000$

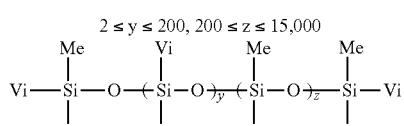

$1 \leq y \leq 200, 200 \leq z \leq 15,000$

[Chemical Formula 16]

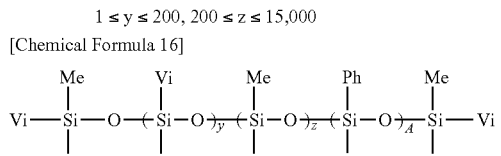

$1 \leq y \leq 200, 200 \leq z \leq 15,000, 1 \leq A \leq 500$

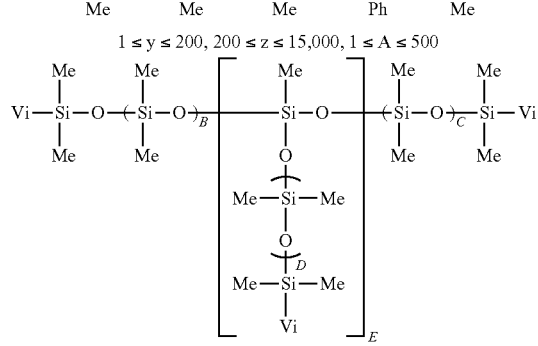

$1 \leq B \leq 5,000, 1 \leq C \leq 5,000, 0 \leq D \leq 5,000, 1 \leq E \leq 100$

[Chemical Formula 17]

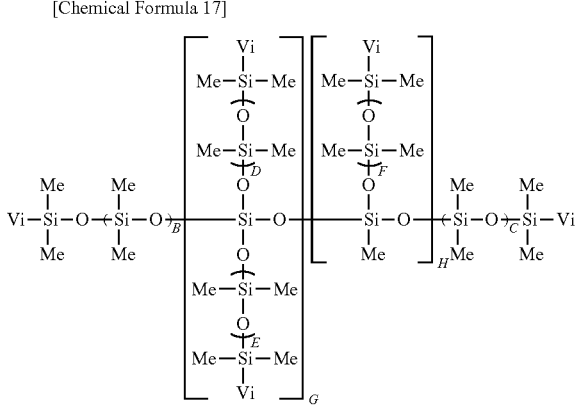

$1 \leq B \leq 5,000, 1 \leq C \leq 5,000, 1 \leq D \leq 100, 1 \leq E \leq 100,$
$1 \leq F \leq 100, 1 \leq G \leq 50, 0 \leq H \leq 100$ The organopolysiloxane as component (A) may be used alone or in admixture of two or more.

[Component (B)] Oil

The organopolysiloxane as component (B) has a structure represented by the general formula (4) and contains at least two alkenyl groups per molecule. Component (B) is blended herein as a component for improving the cure of the composition and reducing the release force of the resulting cured coating while maintaining it non-migratory.

[Chemical Formula 18]

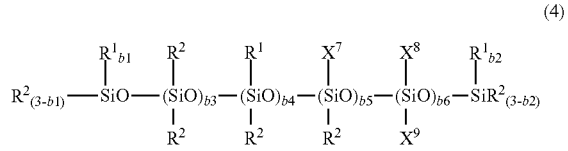

(4)

Herein $R^1$ is independently an alkenyl group, $R^2$ is independently an unsubstituted or halo- or cyano-substituted monovalent hydrocarbon group free of aliphatic unsaturation, $X^7$ is independently a group of the general formula (5-1), $X^8$ is independently a group of the general formula (5-2), and $X^9$ is independently a group of the general formula (5-3).

[Chemical Formula 19]

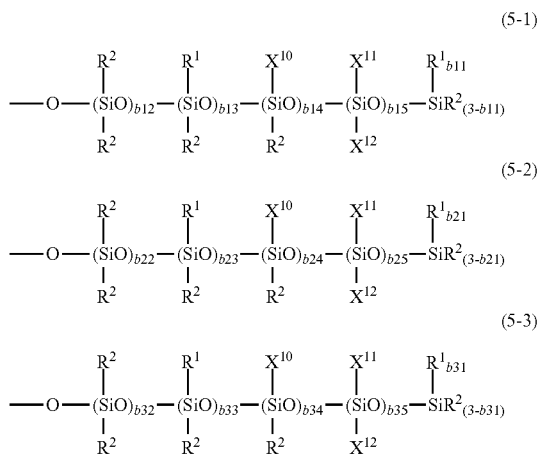

(5-1)

(5-2)

(5-3)

$X^{10}$ is independently a group of the general formula (6-1), $X^{11}$ is independently a group of the general formula (6-2), and $X^{12}$ is independently a group of the general formula (6-3).

[Chemical Formula 20]

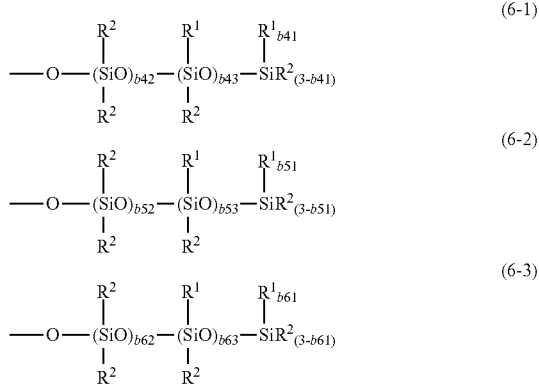

(6-1)

(6-2)

(6-3)

Herein $R^1$ and $R^2$ are as defined above, b1 and b2 each are an integer of 1 to 3, b11, b21, b31, b41, b51, and b61 each are an integer of 0 to 3; b3 is a positive number, b4 to b6, b12 to b15, b22 to b25, b32 to b35, b42, b43, b52, b53, b62, and b63 each are 0 or a positive number, and are selected such that the organopolysiloxane may have a viscosity at 25° C. in the range of 0.005 Pa·s to less than 1 Pa·s or a 30 wt % toluene dilution viscosity of less than 0.01 Pa·s, and be structured in the state that at least four siloxane units not having a silicon-bonded alkenyl group intervene between two siloxane units having a silicon-bonded alkenyl group.

In formula (4), examples of $R^1$ are the same alkenyl groups as exemplified for $R^1$ in formula (1), with vinyl being most preferred.

Also examples of $R^2$ are the same unsubstituted or substituted monovalent hydrocarbon groups free of aliphatic unsaturation as exemplified for $R^2$ in formula (1). Inter alia, alkyl groups such as methyl, ethyl, propyl and butyl, cycloalkyl groups such as cyclohexyl, and aryl groups such as phenyl are preferred.

The organopolysiloxane as component (B) contains at least two alkenyl groups per molecule. An organopolysiloxane with less than two alkenyl groups causes migration because of a strong possibility of uncrosslinked molecules being left even after curing. Desirably, the content of alkenyl groups per 100 g of the organopolysiloxane is from 0.015 to 1 mole, more desirably 0.05 to 1 mole, and even more desirably 0.1 to 0.6 mole. An alkenyl content of at least 0.015 mole ensures a cure-facilitating effect whereas a content in excess of 1 mole may allow the release force to become higher.

In formula (4), parameters are desirably selected such that the number of alkenyl groups per molecule falls in the range of 2 to 200, preferably 2 to 100, and more preferably 2 to 50. In this case, the number of alkenyl groups is calculated from [b1+b2+b4+b5×{b11+b13+b14×(b41+b43)+b15×(b51+b53+b61+b63)}+b6×{b21+b23+b31+b33+(b24+b34)×(b41+b43)+(b25+b35)×(b51+b53+b61+b63)}].

In formula (4), b1 and b2 each are an integer of 1 to 3, b11, b21, b31, b41, b51, and b61 each are an integer of 0 to 3.

Further in formula (4), b3 is a positive number, b4 to b6, b12 to b15, b22 to b25, b32 to b35, b42, b43, b52, b53, b62 and b63 each are 0 or a positive number, and are selected so as to meet the viscosity to be described below.

The organopolysiloxane as component (B) is structured in the state that at least four siloxane units not having a silicon-bonded alkenyl group intervene between two siloxane units having a silicon-bonded alkenyl group.

The organopolysiloxane as component (B) has a viscosity at 25° C. in the range of less than 0.01 Pa·s as a 30 wt % toluene dilution viscosity, or the organopolysiloxane itself has a viscosity at 25° C. in the range from 0.005 Pa·s to less than 1 Pa·s, preferably 0.005 to 0.1 Pa·s, more preferably 0.005 to 0.05 Pa·s. If an organopolysiloxane itself has a viscosity at 25° C. of less than 0.005 Pa·s, the resulting composition exerts a less cure-facilitating effect. A viscosity of less than 1 Pa·s ensures a cure-facilitating effect. It is noted that component (B) is exclusive of an organopolysiloxane having a 30 wt % toluene dilution viscosity of at least 0.01 Pa·s at 25° C.

In formula (4), parameters are desirably selected such that the degree of polymerization (DOP) is in the range of 6 to 200, preferably 6 to 100, more preferably 6 to 70, and even more preferably 6 to 50. In this case, the DOP is calculated from [2+b3+b4+b5×{2+b12+b13+b14×(2+b42+b43)+b15×(3+b52+b53+b62+b63)}+b6×{3+b22+b23+b32+b33+(b24+b34)×(2+b42+b43)+(b25+b35)×(3+b52+b53+b62+b63)}].

The organopolysiloxane as component (B) has a main frame structure which is a linear structure of formula (4) wherein b5 and b6 are 0, or a branched structure of formula (4) wherein b5 and/or b6 is not equal to 0.

In the case of an organopolysiloxane of linear structure, its cure may be facilitated by increasing the values of b1 and b2 indicative of the number of alkenyl groups at both ends of the molecular chain, or by reducing the DOP. More preferably, component (B) has a DOP of up to 50, corresponding to formula (4) wherein 4≤b3+b4≤11, or a Mw of less than 1,000.

Also, the organopolysiloxane as component (B) is more likely to exert a low release force effect as the values of b4, b13, b23, b33, b43, b53, and b63 in formula (4) are smaller. However, too low an alkenyl content may lead to a decline of cure. In this case, cure may be facilitated by increasing the values of b1 and b2 indicative of the number of alkenyl groups at both ends of the molecular chain in formula (4), or by reducing the DOP. Another effective means is to change the main frame structure of the organopolysiloxane having formula (4) to a structure containing a branched structure wherein b5 and/or b6 are not equal to 0. This means is advantageous for facilitating the cure while maintaining the low release force of a cured coating.

It has been confirmed that the cure facilitating effect of the inventive silicone composition is more readily available as the difference between the viscosity of component (B) and the viscosity of component (A) is greater. Since component (A) having a relatively high viscosity is a high molecular weight organopolysiloxane, it is fully curable in the sense that a molecular weight build-up rapidly takes place when only some alkenyl groups undergo crosslinking reaction. As the molecule becomes longer or larger, the spatial movement of alkenyl groups is more restricted. There is a likelihood that portions having less alkenyl groups and hence a lower crosslinking density are locally left. Under certain curing conditions, low crosslinking density portions are increased or enlarged enough to reduce the strength of a cured coating, which is observable as a lack of cure. It is presumed that if component (B) having a relatively low viscosity coexists with component (A), component (B) readily migrates, by virtue of its low molecular weight, to the low crosslinking density portion whereupon crosslinking reaction takes place. As a result, cure is facilitated in that the strength of a cured coating is increased, and a cured coating having a sufficient strength can be formed in a short time.

Examples of component (B) are given below, but not limited thereto. In the following formulae, units with subscripts y, z and A may be randomly bonded and arranged such that at least four siloxane units not having a silicon-bonded alkenyl group intervene between two siloxane units having a silicon-bonded alkenyl group.

[Chemical Formula 21]

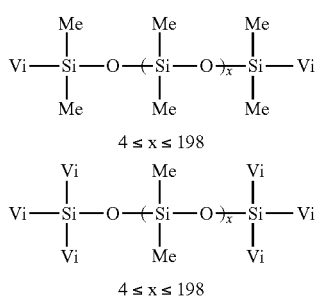

$4 \leq x \leq 198$ $4 \leq x \leq 198$

[Chemical Formula 22]

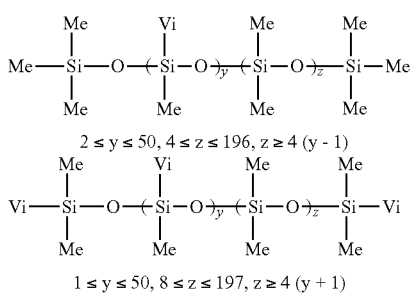

$2 \leq y \leq 50, 4 \leq z \leq 196, z \geq 4(y-1)$ $1 \leq y \leq 50, 8 \leq z \leq 197, z \geq 4(y+1)$

[Chemical Formula 23]

$1 \leq y \leq 50, 8 \leq z + A \leq 197, z + A \geq 4(y+1)$

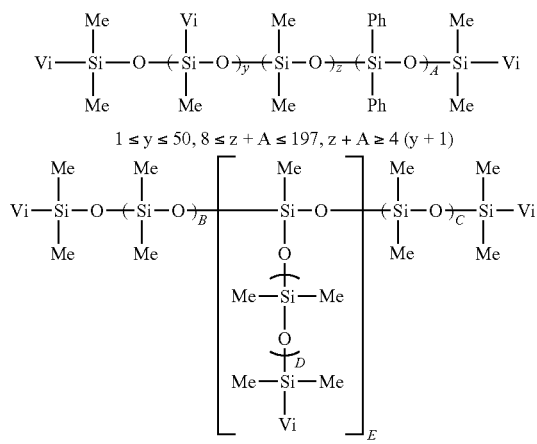

$2 \leq B \leq 190, 2 \leq C \leq 190, 1 \leq D \leq 190, 1 \leq E \leq 60$

[Chemical Formula 24]

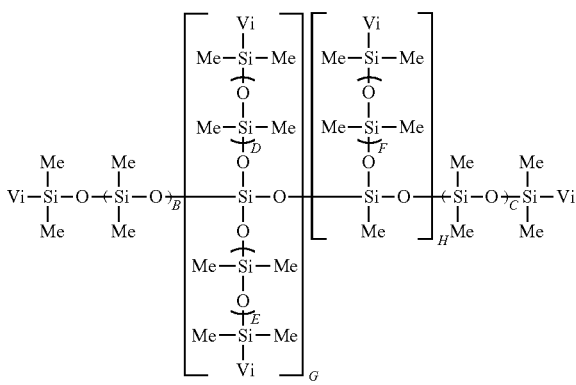

$2 \leq B \leq 187, 2 \leq C \leq 187, 1 \leq D \leq 186, 2 \leq E \leq 187,$
$1 \leq F \leq 186, 1 \leq G \leq 31, 0 \leq H \leq 62$ The organopolysiloxane as component (B) may be used alone or in admixture of two or more.

The amount of component (B) blended is 0.5 to 20 parts, preferably 1 to 15 parts by weight per 100 parts by weight of component (A). An amount of less than 0.5 part by weight is insufficient to achieve a cure-facilitating effect to a coating of the composition whereas an amount in excess of 20 parts by weight rather causes a lack of cure.

[Component (C)] Crosslinker

Component (C) is an organohydrogenpolysiloxane containing at least two silicon-bonded hydrogen atoms (SiH groups) per molecule, represented by the average compositional formula (7).

$$R^2{}_{c1}H_{c2}SiO_{(4-c1-c2)/2} \qquad (7)$$

Herein $R^2$ is as defined above, c1 is a positive number of 0.1 to 2, c2 is a positive number of 0.1 to 3, c1+c2 is a positive number of 1 to 3, and selected such that the organohydrogenpolysiloxane may contain at least two SiH groups per molecule and have a viscosity at 25° C. in the range of 0.005 to 10 Pa·s.

In formula (7), examples of $R^2$ are the same unsubstituted or substituted monovalent hydrocarbon groups free of aliphatic unsaturation as exemplified for $R^2$ in formula (1). Inter alia, alkyl groups such as methyl, ethyl, propyl and butyl, cycloalkyl groups such as cyclohexyl, and aryl groups such as phenyl are preferred.

The subscript c1 is a positive number of 0.1 to 2, preferably 0.2 to 1.5, c2 is a positive number of 0.1 to 3, preferably 0.2 to 2, c1+c2 is a positive number of 1 to 3, preferably 1.5 to 2.8, and selected such that the organohydrogenpolysiloxane may contain at least two SiH groups per molecule and have a viscosity at 25° C. in the range of 0.005 to 10 Pa·s, preferably 0.01 to 10 Pa·s. A viscosity outside the range leads to a lack of cure.

The organohydrogenpolysiloxane as component (C) contains at least 2, preferably 3 to 1,000 silicon-bonded hydrogen atoms per molecule. Less than 2 SiH groups lead to under-cure. Desirably, the content of SiH groups per 100 g of the organohydrogenpolysiloxane is 0.1 to 1.7 moles, more desirably 0.2 to 1.7 moles, even more desirably 0.3 to 1.7 moles. Too low a SiH group content may lead to under-cure whereas too high a content may lead to a decline of shelf stability.

Examples of the compound having formula (7) include linear methylhydrogensiloxane which is a polymer consisting of $Me_3SiO_{1/2}$ and $Me(H)SiO_{2/2}$ siloxane units; linear methylhydrogensiloxane which is a polymer consisting of $Me_2(H)SiO_{1/2}$, $Me(H)SiO_{2/2}$, and $Me_2SiO_{2/2}$ siloxane units; linear methylphenylhydrogensiloxane which is a polymer consisting of $Me_3SiO_{1/2}$, $Me(H)SiO_{2/2}$, and $MePhSiO_{2/2}$ siloxane units; linear methylphenylhydrogensiloxane which is a polymer consisting of $Me_2(H)SiO_{1/2}$, $Me(H)SiO_{2/2}$, and $Ph_2SiO_{2/2}$ siloxane units; branched methylhydrogensiloxane which is a polymer consisting of $Me_3SiO_{1/2}$, $Me(H)SiO_{2/2}$, and $MeSiO_{3/2}$ siloxane units; branched methylphenylhydrogensiloxane which is a polymer consisting of $Me_2(H)SiO_{1/2}$, $Me(H)SiO_{2/2}$, $Ph_2SiO_{2/2}$ and $PhSiO_{3/2}$ siloxane units; cyclic methylhydrogensiloxane which is a polymer consisting of $Me(H)SiO_{2/2}$ siloxane units; cyclic methylhydrogensiloxane which is a polymer consisting of $Me_2SiO_{2/2}$ and $Me(H)SiO_{2/2}$ siloxane units; and cyclic methylphenylhydrogensiloxane which is a polymer consisting of $MePhSiO_{2/2}$ and $Me(H)SiO_{2/2}$ siloxane units.

More preferably, component (C) is an organohydrogenpolysiloxane of linear or branched structure having the general formula (8) and/or an organohydrogenpolysiloxane of cyclic structure having the general formula (9), while an organohydrogenpolysiloxane containing both a linear structure and a cyclic structure in the molecule is also acceptable.

[Chemical Formula 25]

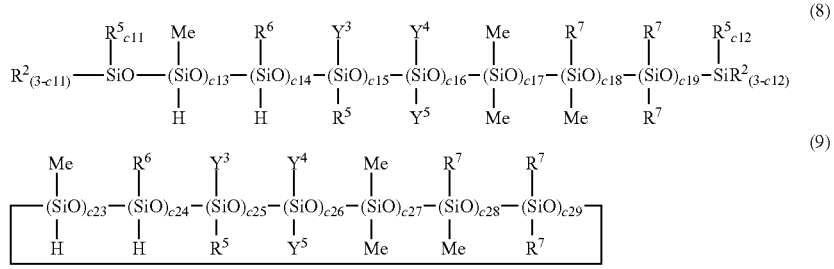

The organohydrogenpolysiloxane as component (C) should preferably have a viscosity at 25° C. in the range of 0.005 to 10 Pa·s, more preferably 0.005 to 5 Pa·s. Too low a viscosity may lead to under-cure whereas too high a viscosity may lead to a lack of shelf stability.

The molecular structure of component (C) may be linear, branched or cyclic, or a combination thereof, or a mixture of plural structures.

Herein $R^2$ is as defined above, $R^5$ is independently hydrogen or an unsubstituted or halo- or cyano-substituted monovalent hydrocarbon group free of aliphatic unsaturation, $R^6$ and $R^7$ each are an unsubstituted or halo- or cyano-substituted monovalent hydrocarbon group free of aliphatic unsaturation, exclusive of Me, $Y^3$ is independently a group of the general formula (10-1), $Y^4$ is independently a group of the general formula (10-2), and $Y^5$ is independently a group of the general formula (10-3).

[Chemical Formula 26]

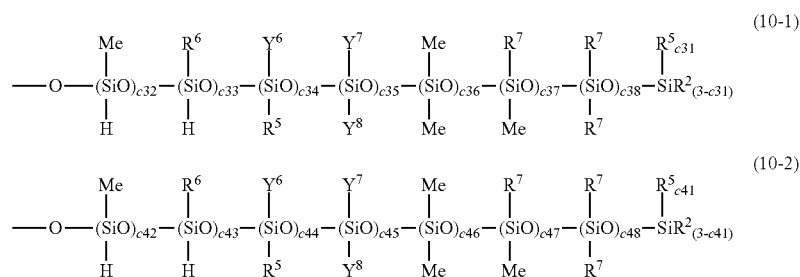

-continued (10-3)
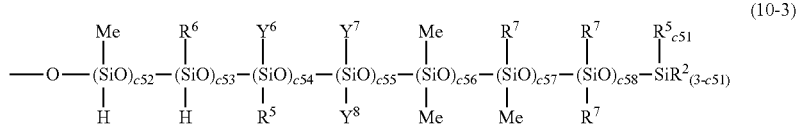

$Y^6$ is independently a group of the general formula (11-1), $Y^7$ is independently a group of the general formula (11-2), and $Y^8$ is independently a group of the general formula (11-3).

[Chemical Formula 27]

(11-1)
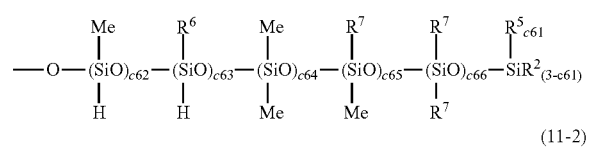

(11-2)
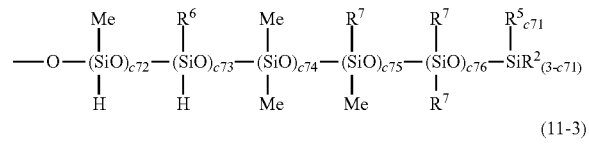

(11-3)
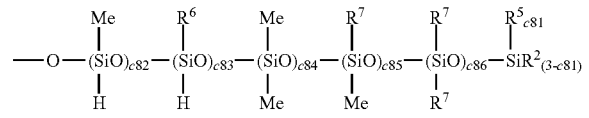

Herein $R^5$, $R^6$ and $R^7$ are as defined above, c11, c12, c31, c41, c51, c61, c71, and c81 each are an integer of 0 to 3, c23 is an integer of at least 2, c13 to c19, c24 to c29, c32 to c38, c42 to c48, c52 to c58, c62 to c66, c72 to c76, and c82 to c86 each are an integer of at least 0, c23+c24+c25+c26+c27+c28+c29 is an integer of at least 3, and are selected such that the organohydrogenpolysiloxane may contain at least three silicon-bonded hydrogen atoms (SiH groups) per molecule and have a viscosity at 25° C. in the range of 0.005 to 10 Pa·s.

In formulae (8) and (9), examples of $R^2$ are the same unsubstituted or substituted monovalent hydrocarbon groups free of aliphatic unsaturation as exemplified for $R^2$ in formula (1). Inter alia, alkyl groups such as methyl, ethyl, propyl and butyl, cycloalkyl groups such as cyclohexyl, and aryl groups such as phenyl are preferred.

$R^5$ is each independently hydrogen or an unsubstituted or substituted monovalent hydrocarbon group free of aliphatic unsaturation. Exemplary of $R^5$ are hydrogen, and unsubstituted or substituted monovalent hydrocarbon groups of preferably 1 to 20 carbon atoms, more preferably 1 to 15 carbon atoms, free of aliphatic unsaturation, including alkyl groups such as methyl, ethyl, propyl and butyl, cycloalkyl groups such as cyclohexyl, aryl groups such as phenyl and tolyl, and substituted forms of the foregoing in which one or more or even all carbon-bonded hydrogen atoms are substituted by halogen atoms, e.g., fluorine, chlorine and bromine, or cyano, such as chloromethyl, trifluoropropyl and cyanoethyl. Inter alia, hydrogen, alkyl groups such as methyl, ethyl, propyl and butyl, cycloalkyl groups such as cyclohexyl, and aryl groups such as phenyl are preferred.

$R^6$ and $R^7$ are each independently an unsubstituted or substituted monovalent hydrocarbon group free of aliphatic unsaturation, exclusive of Me. Exemplary of $R^6$ and $R^7$ are unsubstituted or substituted monovalent hydrocarbon groups of preferably 1 to 20 carbon atoms, more preferably 1 to 15 carbon atoms, free of aliphatic unsaturation, including alkyl groups such as ethyl, propyl and butyl, cycloalkyl groups such as cyclohexyl, aryl groups such as phenyl and tolyl, and substituted forms of the foregoing in which one or more or even all carbon-bonded hydrogen atoms are substituted by halogen atoms, e.g., fluorine, chlorine and bromine, or cyano, such as chloromethyl, trifluoropropyl and cyanoethyl.

Of these, $R^6$ is preferably an alkyl group because an effect that the property of a cured coating is changed by varying the carbon count of a substituent group is obtainable. However, since there is a tendency that as the carbon count becomes larger, cure is inversely reduced, it is preferred to select $R^6$ from groups of up to 4 carbon atoms. From the industrial standpoint, ethyl and propyl are preferred. For parting properties, ethyl of 2 carbon atoms is a desirable choice. Also, $R^7$ is preferably an alkyl group such as ethyl, propyl or butyl or a cycloalkyl group such as cyclohexyl.

Although the substituent groups in the molecule of component (C) may be different from each other, it is economically advantageous that methyl account for at least 50 mol %, more preferably at least 80 mol % of the entire substituent groups. For the release film, there are many applications where the cured coating is required to have higher transparency or stronger adhesion to the substrate. In such a case, by changing the substituent group in component (C) to a bulky substituent group of a higher carbon count than methyl or an aromatic substituent group, an effect of promoting wetting to or interaction with the film substrate surface is available. Provided that component (C1) is component (C) free of an aromatic substituent and component (C2) is component (C) containing an aromatic substituent, it is desirable to use a mixture of organohydrogenpolysiloxanes in a (C1)/(C2) weight ratio of from 1/9 to 9/1, especially from 2/8 to 9/1, because there is readily achieved a balance with other properties of a cured coating such as release force.

In this embodiment, component (C1) preferably has the structure of the general formula (5) and/or (6) wherein $R^2$ is a monovalent hydrocarbon group free of aliphatic unsaturation, exclusive of aromatic group, $R^5$ is hydrogen or a monovalent hydrocarbon group free of aliphatic unsaturation, exclusive of aromatic group, $R^6$ and $R^7$ each are a monovalent hydrocarbon group free of aliphatic unsaturation, exclusive of aromatic group.

Component (C2) preferably has the structure of the general formula (8) and/or (9) wherein at least one of $R^2$, $R^5$, $R^6$ and $R^7$ is a monovalent hydrocarbon group having an aromatic group.

In formulae (8) and (9), c11, c12, c31, c41, c51, c61, c71, and c81 each are an integer of 0 to 3, preferably 0 or 1.

The organohydrogenpolysiloxane as component (C) is preferably an organohydrogenpolysiloxane containing at least two $R^2_2HSiO_{1/2}$ units (wherein $R^2$ is as defined above) per molecule, or a mixture partially containing said organohydrogenpolysiloxane.

In formulae (8) and (9), c23 is an integer of at least 2, c13 to c19, c24 to c29, c32 to c38, c42 to c48, c52 to c58, c62 to c66, c72 to c76, and c82 to c86 each are an integer of at least 0, and are selected such that the organohydrogenpolysiloxane may contain at least three SiH groups per molecule and meet the viscosity of component (C).

It is noted that in formula (9), c23+c24+c25+c26+c27+c28+c29 is an integer of at least 3.

The organohydrogenpolysiloxane having formula (8) or (9) contains at least three SiH groups. If the number of SiH groups is less than 3, a longer time may be needed for curing, detracting from production efficiency.

In formula (8), parameters are desirably selected such that the number of SiH groups per molecule is in the range of 3 to 1,000, more preferably 3 to 500. In this case, the number of SiH groups per molecule is calculated from [c11+c12+c13+c14+c15×{c31+c32+c33+c34×(c61+c62+c63)}+c16×{c41+c42+c43+c51+c52+c53+(C44+c54)×(c61+c62+c63)+(c45+c55)×(c71+c72+c73+c81+c82+c83)}].

In formula (9), parameters are desirably selected such that the number of SiH groups per molecule is in the range of 3 to 100, more preferably 4 to 50. In this case, the number of SiH groups per molecule is calculated from [c23+c24+c25×{c31+c32+c33+c34×(c61+c62+c63)}+c26×{c41+c42+c43+c51+c52+c53+(c44+c54)×(c61+c62+c63)+(c45+c55)×(c71+c72+c73+c81+c82+c83)}].

In formula (8), parameters are desirably selected such that the DOP is in the range of 3 to 1,000, more preferably 3 to 500. In this case, the DOP is calculated from [2+c13+c14+c15×{2+c32+c33+c34×(2+c62+c63+c64+c65+c66)+c35×{3+c72+c73+c74+c75+c76+c82+c83+c84+c85+c86}+c36+c37+c38}+c16×{3+c42+c43+c46+c47+c48+c52+c53+c56+c57+c58+(c44+c54)×(2+c62+c63+c64+c65+c66)+(c45+c55)×(3+c72+c73+c74+c75+c76+c82+c83+c84+c85+c86)}+c17+c18+c19].

In formula (9), parameters are desirably selected such that the DOP is in the range of 3 to 100, more preferably 4 to 50. In this case, the DOP is calculated from [c23+c24+c25×{2+c32+c33+c34×(2+c62+c63+c64+c65+c66)+c35×{3+c72+c73+c74+c75+c76+c82+c83+c84+c85+c86}+c36+c37+c38}+c26×{3+c42+c43+c46+c47+c48+c52+c53+c56+c57+c58+(c44+c54)×(2+c62+c63+c64+c65+c66)+(c45+c55)×(3+c72+c73+c74+c75+c76+c82+c83+c84+c85+c86)}+c27+c28+c29].

Examples of the organohydrogenpolysiloxanes having formulae (8) and (9) are given below, but not limited thereto. More preferably, J is 20 and K is 50.

[Chemical Formula 28]

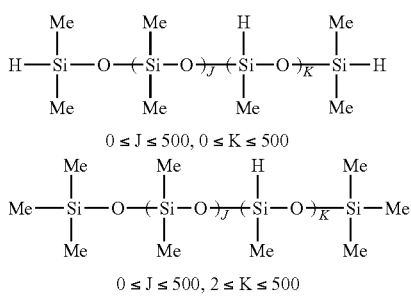

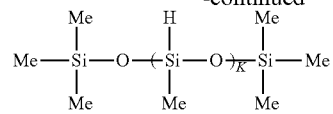

$2 \leq K \leq 500$

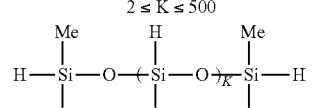

$0 \leq K \leq 500$

[Chemical Formula 29]

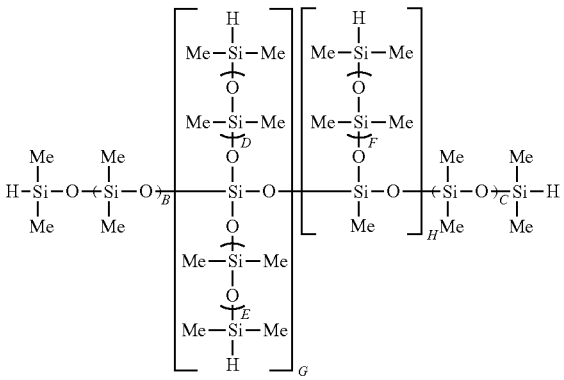

$0 \leq B \leq 200, 0 \leq C \leq 200, 0 \leq D \leq 100, 0 \leq E \leq 100,$
$0 \leq F \leq 100, 0 \leq G \leq 50, 0 \leq H \leq 100$

[Chemical Formula 30]

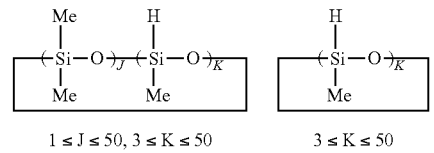

$1 \leq J \leq 50, 3 \leq K \leq 50$    $3 \leq K \leq 50$

Exemplary of the organohydrogenpolysiloxane containing both a linear structure and a branched structure in the molecule is an organohydrogenpolysiloxane having both linear and branched structures wherein an organohydrogenpolysiloxane having formula (8) and an organohydrogenpolysiloxane having formula (9) are crosslinked between one of molecular terminal SiH groups in formula (8) and one of SiH groups in formula (9) and Si atoms are bonded via a divalent organic group (e.g., —CH₂—CH₂—) or oxygen atom (—O—).

Since the crosslinked state of a cured coating differs among linear, branched and cyclic structures, release properties may be controlled by a choice among these structures. The cyclic structure is effective for making a cured coating harder and reducing the temperature dependence of release force. The linear structure is effective for lightening the release force of a cured coating. The branched structure is effective for facilitating the cure of a composition in that more terminal SiH functional groups which are advantageous for curing reaction can be introduced.

Of the branched organohydrogenpolysiloxanes having formula (8), examples of the branched organohydrogenpolysiloxane of special structure include siloxanes (HMT siloxanes, hereinafter) consisting of monofunctional $R^2_2HSiO_{1/2}$ siloxane units (referred to as $M^H$ units hereinafter) and/or $R^2_3SiO_{1/2}$ siloxane units (referred to as M units hereinafter), and trifunctional $R_2SiO_{3/2}$ siloxane units (referred to as T units hereinafter), and siloxanes (HMQ siloxanes, hereinafter) consisting of $M^H$ units or M units and tetrafunctional $SiO_{4/2}$ siloxane units (referred to as Q units hereinafter) wherein $R^2$ is as defined above.

In any of the siloxanes, it is preferred from the industrial aspect that the group $R^2$ be Me and Ph.

In the HMT siloxane, a molar ratio of ($M^H$ units+M units)/T units is preferably from 2/8 to 8/2, especially 3/7 to 7/3, and a molar ratio of M units/$M^H$ units is preferably 0/10 to 9/1, especially 0/10 to 8/2. It is also preferred that $M^H$ unit or M unit be bonded to the molecular end although it is acceptable that silanol or alkoxy groups form some ends.

Likewise in the HMQ siloxane, a molar ratio of ($M^H$ units+M units)/Q units is preferably from 2/8 to 8/2, especially 3/7 to 7/3, and a molar ratio of M units/$M^H$ units is preferably 0/10 to 9/1, especially 0/10 to 8/2. It is also preferred that $M^H$ unit or M unit be bonded to the molecular end although it is acceptable that silanol or alkoxy groups form some ends.

Examples of the HMT siloxane and HMQ siloxane are given below.

[Chemical Formula 31]

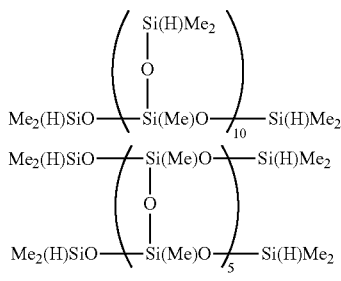

[Chemical Formula 32]

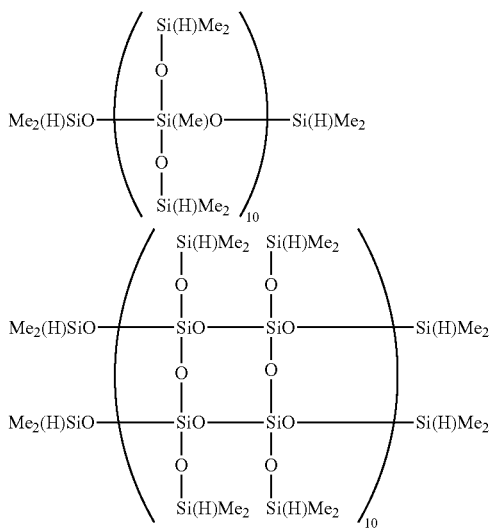

It is believed that these HMT and HMQ siloxanes having a SiH group at the molecular end undergo rapid reaction with alkenyl groups and thus contribute to an improvement in cure.

Notably, in the HMQ siloxane, it is preferable to increase the molar ratio of ($M^H$ units+M units)/Q units or to reduce the DOP for the purpose of suppressing release tightening. It is known from the past that the HMT and HMQ siloxanes are used as a release tightening control agent. Since their function varies depending on such factors as functionality content, molecular weight, and intramolecular crosslinking density, they do not always exert a release tightening effect. The release tightening can be effectively suppressed by increasing the molar ratio of ($M^H$ units+M units)/Q units or T units or by reducing the DOP. Also a similar effect is achieved by introducing difunctional $(R^2)_2SiO_{2/2}$ siloxane units (referred to as D units, hereinafter) to form HMDQ or HMDT siloxane.

The organohydrogenpolysiloxane as component (C) may be used alone or in admixture of two or more.

The organohydrogenpolysiloxane as component (C) is used in such an amount that the moles of silicon-bonded hydrogen atoms (SiH groups) in component (C) is 0.5 to 10 times, preferably 0.6 to 10 times the total moles of alkenyl groups and unsaturated groups in components (A) and (B) (and optional components to be described later). If the moles of SiH groups in component (C) is less than 0.5 time the total moles of alkenyl (unsaturated) groups, the outcome is insufficient cure. Blending more than 10 times brings about no significant increase of exposure resistance or other effects, rather causes a change with time, and is economically disadvantageous. Generally stated, the organohydrogenpolysiloxane may be blended in an amount of 0.1 to 30 parts by weight per 100 parts by weight of the organopolysiloxane as component (A).

[Component (D)] Catalyst

Component (D) is a platinum group metal base catalyst (addition reaction catalyst) which promotes crosslinking reaction between component (A), component (B) (and an optional component containing alkenyl group, to be described later) and component (C) to form a cured coating. Suitable addition reaction catalysts include platinum black, chloroplatinic acid, chloroplatinic acid-olefin complexes, chloroplatinic acid-alcohol coordination compounds, platinum vinyl-containing siloxane coordination compounds, rhodium, rhodium-olefin complexes.

The amount of the addition reaction catalyst used is a catalytic amount, which may be increased or reduced depending on the reactivity of components or the desired cure rate. It is preferred for forming a satisfactory cured coating to blend the catalyst in an amount to give 5 to 1,000 ppm (weight ratio) of platinum or rhodium based on the total weight of components (A) to (C).

[Component (E)] Solvent

Component (E) is an organic solvent, which is optionally blended for the purpose of improving the stability of treating bath and the ease of coating to various substrates, or adjusting the coating weight and viscosity. Particularly when the silicone composition is intended for release film, the solvent is preferably blended because it advantageously exerts the effects of enabling thin film coating and improving the surface smoothness of a cured coating. Exemplary organic solvents include toluene, xylene, ethyl acetate, acetone, methyl ethyl ketone, hexane, and 2-butanone, in which the composition is uniformly dissolvable.

It is noted that when the danger and safety loss of the organic solvent are undesired, the composition may be used as a solventless release paper or film-forming silicone composition without blending component (E). However, losses of quality factors such as outer appearance, surface smoothness and thickness uniformity of cured coating due to inefficient coating, as compared with the use of component (E), are unavoidable. It should be determined depending on the required quality level whether or not the solvent is used.

The organic solvent as component (E) may be used alone or in admixture.

The amount of component (E), if any, is preferably 10 to 100,000 parts, more preferably 10 to 10,000 parts by weight per 100 parts by weight of component (A). Too much amounts may make it difficult to control the coating weight. If the amount is too small, the solvent blending effect may be lost or no improvements in coating or pot life are observable.

[Preparation Method]

The inventive silicone composition may be readily prepared by mixing the foregoing components (A), (B), (C), (D), and (E) until uniform. For a sufficient pot life, it is recommended to add and mix component (C) or (D) immediately before coating. When an organic solvent as component (E) is used, it is advantageous to dissolve component (A) in component (E) uniformly and then mix components (B) and (C) or components (B) and (D) therewith.

In the inventive silicone composition, components (F) to (I) may be used as optional or additional components insofar as the effects of the invention are not compromised.

[Component (F)] Slip-Imparting Component

Component (F) is an organopolysiloxane having the general formula (12). Component (F) differs from component (A) in that it does not contain an alkenyl group as the functional group.

[Chemical Formula 33]

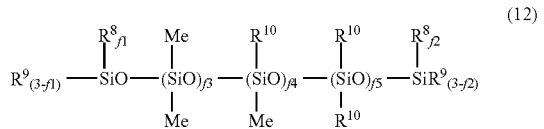

(12)

Herein $R^8$ is independently a hydroxyl, alkoxy or alkoxyalkyl group, $R^9$ is independently a hydroxyl group, alkoxy group, alkoxyalkyl group, or unsubstituted or halo- or cyano-substituted monovalent hydrocarbon group free of aliphatic unsaturation, $R^{10}$ is independently a hydroxyl group, alkoxy group, alkoxyalkyl group, or unsubstituted or halo- or cyano-substituted monovalent hydrocarbon group free of aliphatic unsaturation, exclusive of Me, f1 and f2 each are an integer of 1 to 3, f3 to f5 are such integers that the organopolysiloxane may have a viscosity at 25° C. in the range of at least 1 Pa·s and a 30 wt % toluene dilution viscosity of up to 100 Pa·s.

In formula (12), $R^8$ is independently a hydroxyl, alkoxy or alkoxyalkyl group. Suitable alkoxy groups are those of 1 to 6 carbon atoms including methoxy, ethoxy, propoxy, isopropoxy, n-butoxy, sec-butoxy, and tert-butoxy. Suitable alkoxyalkyl groups are those of 2 to 6 carbon atoms including methoxyethyl, ethoxyethyl, methoxypropyl, ethoxypropyl, methoxybutyl and ethoxybutyl.

$R^9$ is independently a hydroxyl group, alkoxy group, alkoxyalkyl group, or unsubstituted or substituted monovalent hydrocarbon group free of aliphatic unsaturation. Suitable alkoxy and alkoxyalkyl groups are as exemplified for $R^8$. Suitable unsubstituted or substituted monovalent hydrocarbon groups free of aliphatic unsaturation are unsubstituted or substituted monovalent hydrocarbon groups of preferably 1 to 20 carbon atoms, more preferably 1 to 15 carbon atoms, including alkyl groups such as methyl, ethyl, propyl and butyl, cycloalkyl groups such as cyclohexyl, aryl groups such as phenyl and tolyl, or substituted forms of the foregoing in which one or more or even all of carbon-bonded hydrogen atoms are substituted by halogen atoms such as fluorine, chlorine and bromine, or cyano, such as chloromethyl, trifluoropropyl, and cyanoethyl. $R^9$ is preferably a hydroxyl group, alkoxy group, alkoxyalkyl group, or unsubstituted monovalent hydrocarbon group free of aliphatic unsaturation, more preferably an alkyl group such as methyl, ethyl, propyl or butyl, a cycloalkyl group such as cyclohexyl or an aryl group such as phenyl or tolyl.

$R^{10}$ is independently a hydroxyl group, alkoxy group, alkoxyalkyl group, or unsubstituted or substituted monovalent hydrocarbon group free of aliphatic unsaturation, exclusive of Me. Suitable alkoxy and alkoxyalkyl groups are as exemplified for $R^8$. Suitable unsubstituted or substituted monovalent hydrocarbon groups free of aliphatic unsaturation, exclusive of Me, are unsubstituted or substituted monovalent hydrocarbon groups of preferably 1 to 20 carbon atoms, more preferably 1 to 15 carbon atoms, including alkyl groups such as ethyl, propyl and butyl, cycloalkyl groups such as cyclohexyl, aryl groups such as phenyl and tolyl, or substituted forms of the foregoing in which one or more or even all of carbon-bonded hydrogen atoms are substituted by halogen atoms such as fluorine, chlorine and bromine, or cyano, such as chloromethyl, trifluoropropyl, and cyanoethyl. $R^{10}$ is preferably a hydroxyl group, alkoxy group, alkoxyalkyl group, or unsubstituted monovalent hydrocarbon group free of aliphatic unsaturation, more preferably an alkyl group such as ethyl, propyl or butyl, a cycloalkyl group such as cyclohexyl or an aryl group such as phenyl or tolyl.

The subscripts f1 and f2 each are an integer of 1 to 3, preferably 1 or 2; f3 to f5 are such integers as to meet the viscosity defined below.

The organopolysiloxane as component (F) should preferably have a viscosity at 25° C. in the range of at least 1 Pa·s and a 30 wt % toluene dilution viscosity of up to 100 Pa·s, especially in the range of at least 10 Pa·s and a 30 wt % toluene dilution viscosity of up to 50 Pa·s. If the viscosity is too low, a cured coating may be less slippery. Too high a viscosity may sometimes lead to difficulty of industrial handling.

The organopolysiloxane which is a linear polymer free of a functional group on a side chain is effective for imparting slipperiness to a cured coating, and an effect of lightening release force without a loss of residual bond force is expectable. In the release film application, the slippery effect also provides an anti-spalling effect.

Examples of component (F) include the following polysiloxanes.

[Chemical Formula 34]

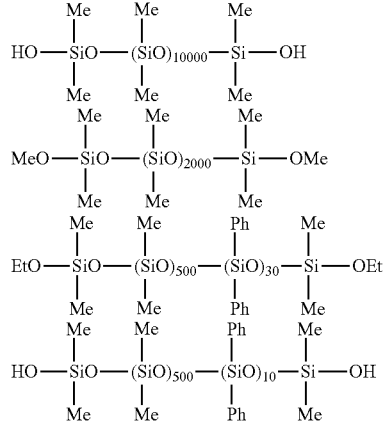

The amount of component (F), if any, is preferably 0.1 to 30 parts, more preferably 0.2 to 20 parts by weight per 100 parts by weight of component (A). Less than 0.1 part of component (F) may fail to exert a slipperiness imparting effect whereas in excess of 30 parts, a loss of residual bond force may be observable.

[Component (G)] Tackifier (VMT)

A component for improving substrate adhesion may be compounded as component (G). Component (G) is an organopolysiloxane having at least two alkenyl groups, essentially comprising monofunctional $R^2_{(3-g1)}R^1_{g1}SiO_{1/2}$ siloxane units (referred to as $M^{R1R2}$ units hereinafter) and trifunctional $R^2SiO_{3/2}$ siloxane units (referred to as $T^{R2}$ units hereinafter) wherein $R^1$ and $R^2$ are as defined above, and g1 is an integer of 1 to 3, wherein a molar ratio of $M^{R1R2}$ units to $T^{R2}$ units is from 2/8 to 8/2, having a viscosity at 25° C. in the range of 0.001 to 1 Pa·s. $M^{R1R2}$ units are desirably bonded to the molecular ends while some silanol or alkoxy groups may form the terminus.

For $R^1$ in the above formula, alkenyl groups as illustrated for $R^1$ in formula (1) are exemplary, with vinyl being industrially preferred. For $R^2$ in the above formulae, unsubstituted or substituted monovalent hydrocarbon groups free of aliphatic unsaturation as illustrated for $R^2$ in formula (1) are exemplary, with methyl and phenyl being industrially preferred. The subscript g1 is an integer of 1 to 3, preferably 1 or 2.

Component (G) is an organopolysiloxane having a molar ratio of $M^{R1R2}$ units to $T^{R2}$ units in the range from 2/8 to 8/2, preferably from 3/7 to 7/3. If this molar ratio is less than 2/8, the adhesion improving effect may be low. An organopolysiloxane having a molar ratio in excess of 8/2 is difficult to produce industrially.

Also, component (G) may contain difunctional $R^2_{(2-g2)}R^1_{g2}SiO_{2/2}$ siloxane units (referred to as $D^{R1R2}$ units hereinafter) and tetrafunctional $SiO_{4/2}$ siloxane units (Q units) wherein g2 is 0, 1 or 2, as long as the effect of component (G) is not compromised. Where stronger adhesion is necessary in the release film application, however, component (G) is desirably a siloxane wherein these units are not contained, and the molar ratio of $M^{R1R2}$ units to $T^{R2}$ units is from 2/8 to 8/2. Where $D^{R1R2}$ units or Q units are contained, their contents should be less than the contents of $M^{R1R2}$ units and $T^{R2}$ units.

It is noted that component (G) differs from component (A) in that the content of $T^{R2}$ units is greater than the content of $D^{R1R2}$ units.

The organopolysiloxane as component (G) preferably contains alkenyl groups in such an amount that the alkenyl content per 100 g of the organopolysiloxane is 0.01 to 2.5 moles, more preferably 0.03 to 2 moles, and even more preferably 0.05 to 1.5 moles. If the alkenyl content is too low, the adhesion improving effect may become weak. If the alkenyl content is too high, the pot life may become short.

The organopolysiloxane as component (G) has a viscosity at 25° C. in the range of 0.001 to 1 Pa·s, preferably 0.005 to 0.5 Pa·s, more preferably 0.01 to 0.1 Pa·s, and even more preferably 0.01 to 0.05 Pa·s and should preferably have such a DOP that the viscosity may fall in the range. If the viscosity is less than 0.001 Pa·s, the adhesion improving effect may become weak. An organopolysiloxane having a viscosity in excess of 1 Pa·s may be less dissolvable or dispersible in the composition.

Examples of component (G) are shown below.

[Chemical Formula 35]

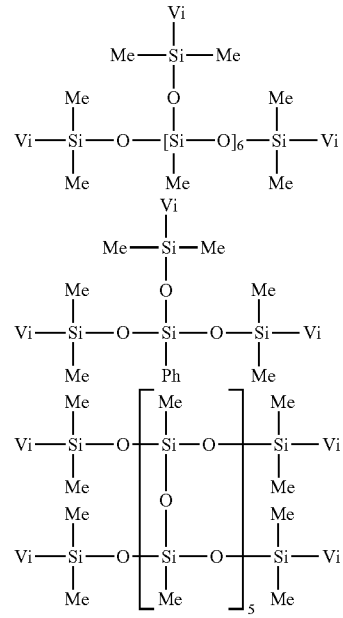

The amount of component (G), if any, is preferably 5 to 100 parts by weight per 100 parts by weight of component (A). Less than 5 parts of component (G) may exert a weak substrate adhesion improving effect whereas more than 100 parts of component (G) may exert a release tightening effect.

When component (G) is blended, component (C) is preferably used in a supplemental amount such that the ratio of moles of SiH groups in component (C) to moles of alkenyl groups in component (G), that is, SiH/alkenyl ratio, may be at least 1, especially from 1 to 3, because any loss of cure is prevented.

[Component (H)] Tackifier (EP)

As another component for improving substrate adhesion, (H) an organosilane having at least epoxy and alkoxysilyl groups per molecule, represented by the general formula (13) and/or a partial hydrolytic (co)condensation siloxane thereof, represented by the average compositional formula (14) may be used.

$$R^{11}_{h1}(OR^{12})_{h2}Si(R^{13})_{(4-h1-h2)} \tag{13}$$

$$R^{11}_{h3}(OR^{12})_{h4}(R^{13})_{h5}SiO_{(4-h3-h4-h5)/2} \tag{14}$$

Herein $R^{11}$ is an epoxy-containing monovalent organic group, $R^{12}$ is a $C_1$-$C_6$ alkyl group which may contain an ether bond, and which may be partially hydrolyzed into a hydroxyl group, $R^{13}$ is an unsubstituted or halo- or cyano-substituted monovalent hydrocarbon group, h1 and h2 are integers in the range: $1 \le h1$, $1 \le h2$, $2 \le h1+h2 \le 4$, h3 to h5 are positive numbers in the range: $0 < h3$, $0 < h4$, $0 \le h5$, $1 < h3+h4+h5 \le 3$, and are selected such that the partial hydrolytic (co)condensation siloxane may have a viscosity at 25° C. in the range of 0.001 to 1 Pa·s.

It is noted that the partial hydrolytic (co)condensation siloxane of formula (14) as component (H) differs from components (A) and (F) in that it contains an epoxy group.

In formulae (13) and (14), examples of the epoxy-containing monovalent organic group represented by $R^{11}$ include 3-glycidoxyalkyl groups such as 3-glycidoxypropyl, and 2-(3,4-epoxycyclohexyl)alkyl groups such as 2-(3,4-epoxycyclohexyl)propyl.

Examples of the $C_1$-$C_6$ alkyl group represented by $R^{12}$ include methyl, ethyl, propyl, isopropyl, butyl, isobutyl, tert-butyl, pentyl, neopentyl, and hexyl. Exemplary of the ether bond-containing alkyl group are $C_1$-$C_6$ alkoxyalkyl groups such as methoxymethyl, ethoxymethyl, propoxymethyl, butoxymethyl, methoxyethyl, ethoxyethyl, propoxyethyl, butoxyethyl, methoxypropyl, ethoxypropyl, methoxybutyl, and ethoxybutyl. Preference is given to methyl, ethyl, propyl, isopropyl, butyl, isobutyl, tert-butyl, methoxymethyl, ethoxymethyl, propoxymethyl, butoxymethyl, methoxyethyl, and ethoxyethyl. Examples of the $OR^{12}$ group include methoxy, ethoxy, propoxy, butoxy, methoxymethoxy, methoxyethoxy, ethoxymethoxy, and ethoxyethoxy.

$R^{13}$ is an unsubstituted or substituted monovalent hydrocarbon group. Examples include unsubstituted or substituted The subscripts h1 and h2 are integers in the range: $1 \le h1$, $1 \le h2$, $2 \le h1+h2 \le 4$, h3 to h5 are positive numbers in the range: $0 < h3$, $0 < h4$, $0 \le h5$, $1 < h3+h4+h5 \le 3$, and are selected so as to meet the viscosity defined below.

The partial hydrolytic (co)condensation siloxane of formula (14) should preferably have a viscosity at 25° C. in the range of 0.001 to 1 Pa·s, more preferably 0.001 to 0.1 Pa·s. If the viscosity is too low, the adhesion improving effect may become weak. An organopolysiloxane having too high a viscosity may be less dissolvable or dispersible in the composition.

The partial hydrolytic (co)condensation siloxane of formula (14) is obtained by adding water to an organosilane of formula (13), effecting reaction in the presence of a catalyst such as hydrochloric acid, sulfuric acid, acetic acid, oxalic acid, maleic acid, phosphoric acid, or p-toluenesulfonic acid, and distilling off the resulting alcohol. Alternatively, an organosilane of formula (13) may be mixed and reacted with another alkoxysilane to form a partial hydrolytic co-condensation siloxane.

Examples of component (H) are given below.

[Chemical Formula 36]

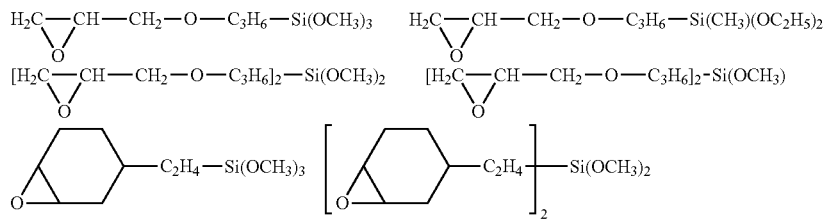

[Chemical Formula 37]

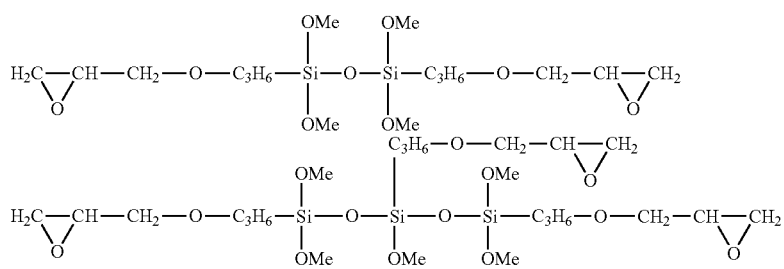

[Chemical Formula 38]

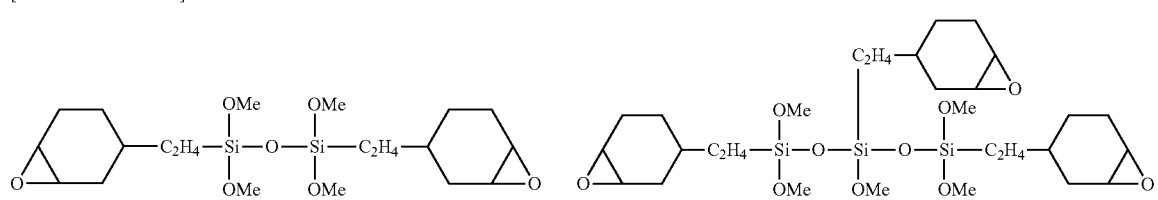

monovalent hydrocarbon groups free of aliphatic unsaturation, of preferably 1 to 20 carbon atoms, more preferably 1 to 15 carbon atoms, for example, alkyl groups such as methyl, ethyl, propyl and butyl, cycloalkyl groups such as cyclohexyl, alkenyl groups such as vinyl, allyl and propenyl, aryl groups such as phenyl and tolyl, or substituted forms of the foregoing in which one or more or even all of carbon-bonded hydrogen atoms are substituted by halogen atoms such as fluorine, chlorine and bromine, or cyano, such as chloromethyl, trifluoropropyl, and cyanoethyl. Among others, those groups free of aliphatic unsaturation are preferred, and methyl, ethyl, propyl, butyl, cyclohexyl and phenyl are more preferred.

The amount of component (H), if any, is preferably 0.1 to 10 parts by weight, more preferably 1 to 8 parts by weight per 100 parts by weight of component (A). Less than 0.1 part of component (H) may fail to exert an adhesion improving effect whereas more than 10 parts of component (H) may bring about a loss of residual bond force.

In the practice of the invention, a catalytic amount of an acid, alkali or metal compound may be added in order to take more advantage of the adhesion improving effect of component (H). These compounds are used to activate the functionality of component (H) and their addition amount is preferably reduced so as to avoid any influence on the cure, pot life and shelf stability of the composition.

[Component (I)] Resin (MQ Resin)

Further a MQ resin consisting of siloxane units ($M^{R1R2}$ units) having the general formula (15) and siloxane units (Q units) having the general formula (16) in a molar ratio ($M^{R1R2}$ units/Q units) of from 2/8 to 8/2 may be used as component (I). This component is used as a release force controlling agent.

$$R^2_{(3-i1)}R^1_{i1}SiO_{1/2} \tag{15}$$

$$SiO_{4/2} \tag{16}$$

Herein $R^1$ and $R^2$ are as defined above, and i1 is an integer of 0 to 3.

For $R^1$ in formula (15), alkenyl groups as illustrated for $R^1$ in formula (1) are exemplary, with such alkenyl groups as vinyl, allyl and propenyl being preferred. For $R^2$, unsubstituted or substituted monovalent hydrocarbon groups free of aliphatic unsaturation, as illustrated for $R^2$ in formula (1) are exemplary. Inter alia, methyl, ethyl, propyl, isopropyl, butyl, pentyl, phenyl and cyclohexyl are preferred. The subscript i1 is an integer of 0 to 3, preferably 0, 1 or 2.

The MQ resin as component (I) has a molar ratio of siloxane units of formula (15) ($M^{R1R2}$ units) to siloxane units of formula (16) (Q units), i.e., ($M^{R1R2}$ units/Q units) which is from 2/8 to 8/2, preferably from 3/7 to 7/3. A resin with too low a molar ratio may be less dissolvable or dispersible in the composition whereas a resin with too high a molar ratio may be less effective as the release force controlling agent.

Also, component (I) may contain difunctional $R^2_{(2-i2)}R^1_{i2}SiO_{2/2}$ siloxane units (referred to as $D^{R1R2}$ units hereinafter) and trifunctional $R^2SiO_{3/2}$ siloxane units ($T^{R2}$ units) or $R^1SiO_{3/2}$ siloxane units ($T^{R1}$ units) wherein i2 is 0, 1 or 2, as long as the benefits of the invention are not compromised. Notably, the contents of $D^{R1R2}$ units and $T^{R2}$ units should be less than the contents of $M^{R1R2}$ units and Q units. Because of these contents, component (I) has a different structure from component (G) and exerts a different effect.

It is noted that component (I) differs from component (A) in that it contains more Q units than $D^{R1R2}$ units and from component (G) in that it contains more Q units than $T^{R2}$ units.

The alkenyl content of the MQ resin as component (I) is preferably 0 to 2.4 moles, more preferably 0 to 2.0 moles, and even more preferably 0 to 1.5 moles as the alkenyl content per 100 g of the organopolysiloxane. If the alkenyl content is too low, the release tightening effect may lower with time. If the alkenyl content is too low, the pot life may become short.

Examples of component (I) are shown below.

[Chemical Formula 39]

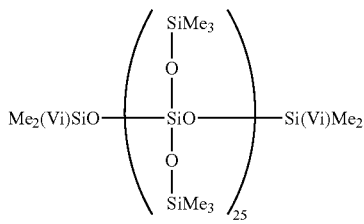

-continued

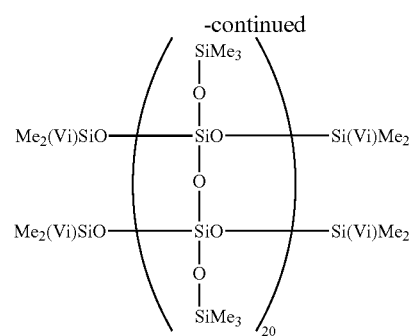

[Chemical Formula 40]

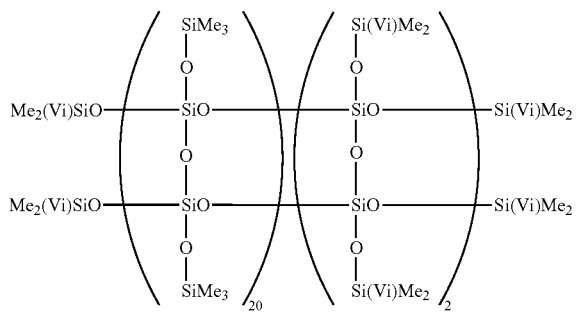

The amount of component (I), if any, is preferably 1 to 100 parts by weight, more preferably 5 to 50 parts by weight per 100 parts by weight of component (A). Less than 1 part of component (I) may be less effective for improving exposure resistance whereas more than 100 parts of component (I) may lead to a lack of cure.

When component (I) contains alkenyl groups, component (C) is preferably used in a supplemental amount such that the ratio of moles of SiH groups in component (C) to moles of alkenyl groups in component (I), i.e., (SiH groups/alkenyl groups) is at least 1, especially from 1 to 10, because any loss of cure is prevented.

[Other Components]

Bath Life Prolonger

In the silicone composition of the invention, a bath life prolonger such as 3-methyl-1-butyn-3-ol, ethynyl cyclohexanol or ethynyl cyclohexene may be compounded in an amount of about 0.01 to 5 parts by weight per 100 parts by weight of component (A).

Surfactant

It is also possible to add a surfactant as the other component. A nonionic surfactant having least influence on addition reaction is preferred. While an antistatic effect is expected, at least 0.1 part by weight of the surfactant per 100 parts by weight of component (A) is necessary for that purpose. Since the composition becomes less curable as the amount of the surfactant added is increased, the amount of the surfactant is desirably limited to 5 parts by weight or less per 100 parts by weight of component (A). The surfactant as the other component that can be compounded herein is also expected to exert an effect of improving compatibility with a hydrophobic component such as a conductive agent for a conductive polymer composition to be described later.

Organic Resin

The inventive silicone composition may contain another organic resin. The organic resin is compounded for the purposes of improving the stability of the treating bath and coating thereof to various substrates, facilitating film formation, adjusting release properties, and adjusting the coating weight and viscosity. Organic resins such as polyvinyl alcohol, poly(meth)acrylate, polyester, cellulose, and derivatives thereof may be used. Suitable derivatives include cellulose derivatives in which some hydroxyl groups are etherified with alkyl groups such as methyl, ethyl, propyl and butyl, with ethyl being preferred.

The organic resin may be added in an amount of 2 to 400 parts by weight per 100 parts by weight of component (A), but it may be omitted if release properties and antistatic properties are affected.

Antistatic Agent

To the silicone composition in one embodiment of the invention, a conductive polymer composition may be compounded for antistatic and conductive purposes as long as the objects of the invention are not compromised. The conductive polymer composition is desirably a composition comprising (a) a π-conjugated conductive polymer, (b) a polyanion with which the π-conjugated conductive polymer (a) is doped, (c) a solubilizing agent (solubilizing polymer), and (d) another component, which is dispersible in a solvent based on an organic solvent.

(a) π-Conjugated Conductive Polymer

As the π-conjugated conductive polymer, an organic polymer having a backbone composed of a π-conjugated system may be used. Examples include polypyrrole, polythiophene, polyacetylene, polyphenylene, polyphenylene vinylene, polyaniline, polyacene, polythiophene vinylene, and copolymers thereof. From the standpoints of ease of polymerization and stability in air, polypyrrole, polythiophene and polyaniline are preferred. Inter alia, polypyrrole and poly(3,4-ethylenedioxythiophene) are more preferred because of higher conductivity and improved heat resistance.

Further, poly(3,4-ethylenedioxythiophene) doped with polystyrene sulfonic acid (abbreviated as PEDOT-PSS) is preferred because of relatively high thermal stability and transparency of a coating as formed due to a low DOP.

(b) Polyanion

As the polyanion, any anionic compounds having an anion group may be used without a particular limit. The anion group may be any functional group capable of chemical oxidative doping to the π-conjugated conductive polymer. Inter alia, mono-substituted sulfate groups, mono-substituted phosphate groups, phosphoric acid groups, carboxyl groups and sulfo groups are preferred from the standpoints of ease of preparation and stability. Further, sulfo groups, mono-substituted sulfate groups, and carboxyl groups are more preferred from the standpoint of doping effect of functional group to the π-conjugated conductive polymer.

Among these, polyacrylic sulfonic acid and polymethacrylic sulfonic acid are preferred. Since polyacrylic sulfonic acid or polymethacrylic sulfonic acid itself decomposes upon absorption of thermal energy, the thermal decomposition of the π-conjugated conductive polymer is mitigated, leading to improvements in heat resistance and environmental resistance.

(c) Solubilizing Polymer

The solubilizing polymer is a polymer capable of solubilizing the i-conjugated conductive polymer. Suitable solubilizing polymers include (c1) a polymer having an anion group and (c2) a polymer having an electron attractive group.

(c1) Polymer Having an Anion Group

Examples of the polymer having an anion group include substituted or unsubstituted polyalkylene, substituted or unsubstituted polyalkenylene, substituted or unsubstituted polyimide, substituted or unsubstituted polyamide, substituted or unsubstituted polyester, and copolymers thereof. These polymers consist of constituent units having an anion group and constituent units free of an anion group.

(c2) Polymer Having an Electron Attractive Group

The polymer having an electron attractive group is a polymer having constituent units derived from a compound having at least one electron attractive group selected from cyano, nitro, formyl, carbonyl, and acetyl groups. Examples of the polymer having an electron attractive group include polyacrylonitrile, polymethacrylonitrile, acrylonitrile-styrene resins, acrylonitrile-butadiene resins, acrylonitrile-butadiene-styrene resins, and hydroxyl or amino-containing resins which are cyanoethylated (e.g., cyanoethyl cellulose), polyvinyl pyrrolidone, alkylated polyvinyl pyrrolidone, and nitrocellulose. Among these, the cyano group is preferred because it is highly polar and more effective for solubilizing the π-conjugated conductive polymer.

(d) Others

Exemplary of the additive to the solvent in which the conductive polymer composition is dissolved or dispersed are a high conductive agent for improving electric conductivity and another dopant.

The high conductive agent serves to improve the electroconductivity of the π-conjugated conductive polymer by interacting with the π-conjugated conductive polymer or the dopant therefor. Examples of the high conductive agent include nitrogen-containing aromatic cyclic compounds, compounds containing two or more hydroxyl groups, compounds containing two or more carboxyl groups, compounds containing one or more hydroxyl groups and one or more carboxyl groups, compounds containing sulfo and carboxyl groups, compounds containing an amide group, compounds containing an imide group, lactam compounds, and compounds containing a glycidyl group.

[Release Paper or Release Film]

The second embodiment of the invention is a release paper or release film comprising a substrate in the form of paper or plastic film and a release agent layer formed on at least one surface of the substrate.

The release agent layer to construct the release paper or release film of the invention is a cured coating of the silicone composition defined above.

The release film preferably has a thickness of 2 to 500 μm, more preferably 10 to 100 μm. The release paper preferably has a thickness of 10 to 1,000 μm, more preferably 50 to 300 μm. The thickness may be measured by any of well-known thickness gauges such as dial gauge and ultrasonic thickness meter.

In the release paper or release film, the thickness of the release agent layer is preferably 0.1 to 5 μm, more preferably 0.1 to 2 μm. The thickness of the release agent layer may be measured by an X-ray fluorescence analyzer.

The plastic film is composed of a resin material, examples of which include polyethylene, polypropylene, polystyrene, polyvinyl chloride, polyvinyl alcohol, polyethylene terephthalate (PET), polybutylene terephthalate, polyethylene naphthalate, polyacrylate, polycarbonate, polyvinylidene fluoride, polyarylate, styrene-base elastomers, polyester-base elastomers, polyether sulfone, polyether imide, polyether ether ketone, polyphenylene sulfide, polyarylate, polyimide, polycarbonate, cellulose triacetate, and cellulose acetate propionate. Of these resin materials, polyethylene terephthalate is preferred from the standpoints of transparency, flexibility, anti-staining and strength.

As the paper, pure paper, kraft paper and coated paper may be used.

The method for preparing a release paper or release film includes the steps of coating the silicone composition to at least one surface of paper or plastic film, and drying the coating.

The coating means is obtainable, for example, by using an applicator such as a bar coater, gravure coater, air knife coater, roll coater, or wire bar. The coating weight is typically in the range of 0.1 to 5.0 g/m$^2$ as solids, but not limited thereto.

The drying means is obtainable, for example, by heating to remove any volatile and solvent components. Examples include a hot air dryer and IR dryer. Alternatively, the coating may be allowed to stand at room temperature. The temperature during drying is preferably 50 to 200° C., more preferably 70 to 180° C. The time of drying is preferably 1 to 120 seconds, more preferably 5 to 90 seconds.

The release paper or release film in the second embodiment of the invention includes the release agent layer in the form of a cured coating of the silicone composition, which is non-migratory and fully release lightening. For this reason, the release paper or release film provides a light release force relative to various pressure-sensitive adhesives (PSAs), is non-migratory and good in residual adhesion, and thus finds use for the protection of adhesive sheets and adhesive tapes for optical and electric/electronic parts.

EXAMPLE

Examples and Comparative Examples are given below although the invention is not limited thereto. In Examples, "pbw" is parts by weight, and "%" is % by weight. The viscosity of a starting material used is measured by a rotational viscometer.

<Starting Materials>

Component (A)

A-1 linear organopolysiloxane consisting of 0.02 mol % of dimethylvinylsiloxane units: $(CH_3)_2(CH_2=CH)SiO_{1/2}$, 0.7 mol % of methylvinylsiloxane units: $(CH_3)(CH_2=CH)SiO_{2/2}$, and 99.28 mol % of dimethylsiloxane units: $(CH_3)_2SiO_{2/2}$.
viscosity at 25° C. of 30% toluene solution=15 Pa·s
vinyl content=0.01 mol/100 g A-2 branched organopolysiloxane consisting of 0.2 mol % of dimethylvinylsiloxane units: $(CH_3)_2(CH_2=CH)SiO_{1/2}$, 0.6 mol % of methylvinylsiloxane units: $(CH_3)(CH_2=CH)SiO_{2/2}$, 99.04 mol % of dimethylsiloxane units: $(CH_3)_2SiO_{2/2}$, and 0.16 mol % of methylsiloxane units: $(CH_3)SiO_{3/2}$.
viscosity at 25° C. of 30% toluene solution=10 Pa·s
vinyl content=0.01 mol/100 g A-3 linear organopolysiloxane consisting of 0.02 mol % of dimethylvinylsiloxane units: $(CH_3)_2(CH_2=CH)SiO_{1/2}$, 0.1 mol % of methylvinylsiloxane units: $(CH_3)(CH_2=CH)SiO_{2/2}$, and 99.88 mol % of dimethylsiloxane units: $(CH_3)_2SiO_{2/2}$.
viscosity at 25° C. of 30% toluene solution=12 Pa·s
vinyl content=0.002 mol/100 g A-4 linear organopolysiloxane consisting of 0.05 mol % of dimethylvinylsiloxane units: $(CH_3)_2(CH_2=CH)SiO_{1/2}$, 0.7 mol % of methylvinylsiloxane units: $(CH_3)(CH_2=CH)SiO_{2/2}$, 96.25 mol % of dimethylsiloxane units: $(CH_3)_2SiO_{2/2}$, and 3 mol % of diphenylsiloxane units: $(C_6H_5)_2SiO_{2/2}$.
viscosity at 25° C. of 30% toluene solution=8 Pa·s
vinyl content=0.01 mol/100 g A-5 linear organopolysiloxane consisting of 0.4 mol % of dimethylvinylsiloxane units: $(CH_3)_2(CH_2=CH)SiO_{1/2}$, 1.2 mol % of methylvinylsiloxane units: $(CH_3)(CH_2=CH)SiO_{2/2}$, 95.4 mol % of dimethylsiloxane units: $(CH_3)_2SiO_{2/2}$, and 3 mol % of diphenylsiloxane units: $(C_6H_5)_2SiO_{2/2}$.
viscosity at 25° C. of 30% toluene solution=0.03 Pa·s
vinyl content=0.02 mol/100 g Component (B)

B-1 linear organopolysiloxane consisting of 2 mol % of dimethylvinylsiloxane units: $(CH_3)_2(CH_2=CH)SiO_{1/2}$ and 98 mol % of dimethylsiloxane units: $(CH_3)_2SiO_{2/2}$.
viscosity at 25° C.=0.01 Pa·s
vinyl content=0.25 mol/100 g B-2 linear organopolysiloxane consisting of 28 mol % of dimethylvinylsiloxane units: $(CH_3)_2(CH_2=CH)SiO_{1/2}$ and 72 mol % of dimethylsiloxane units: $(CH_3)_2SiO_{2/2}$.
viscosity at 25° C.=0.006 Pa·s
vinyl content=0.4 mol/100 g B-3 linear organopolysiloxane consisting of 1.4 mol % of dimethylvinylsiloxane units: $(CH_3)_2(CH_2=CH)SiO_{1/2}$ and 98.6 mol % of dimethylsiloxane units: $(CH_3)_2SiO_{2/2}$.
viscosity at 25° C.=0.4 Pa·s
vinyl content=0.018 mol/100 g B-4 linear organopolysiloxane consisting of 40 mol % of dimethylvinylsiloxane units: $(CH_3)_2(CH_2=CH)SiO_{1/2}$ and 60 mol % of dimethylsiloxane units: $(CH_3)_2SiO_{2/2}$.
viscosity at 25° C.=0.004 Pa·s
vinyl content=0.5 mol/100 g B-5 linear organopolysiloxane consisting of 0.8 mol % of dimethylvinylsiloxane units: $(CH_3)_2(CH_2=CH)SiO_{1/2}$ and 99.2 mol % of dimethylsiloxane units: $(CH_3)_2SiO_{2/2}$.
viscosity at 25° C.=1.5 Pa·s
vinyl content=0.011 mol/100 g B-6 branched organopolysiloxane consisting of 23 mol % of dimethylvinylsiloxane units: $(CH_3)_2(CH_2=CH)SiO_{1/2}$, 69 mol % of dimethylsiloxane units: $(CH_3)_2SiO_{2/2}$, and 8 mol % of methylsiloxane units: $(CH_3)SiO_{3/2}$.
viscosity at 25° C.=0.01 Pa·s
vinyl content=0.3 mol/100 g It is noted that the organopolysiloxanes B-1, B-2, B-3, B-5 and B-6 are structured in the state that at least four siloxane units not having a silicon-bonded alkenyl group intervene between two siloxane units having a silicon-bonded alkenyl group.

B-7 cyclic organopolysiloxane consisting of 100 mol % of vinylmethylsiloxane units: $(CH_2=CH)(CH_3)SiO_{2/2}$, represented by the following formula.
viscosity at 25° C.=0.004 Pa·s
vinyl content=1.1 mol/100 g

[Chemical Formula 41]

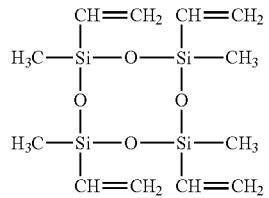

Component (C)

C-1 linear organohydrogenpolysiloxane consisting of 5 mol % of trimethylsiloxane units: $(CH_3)_3SiO_{1/2}$ and 95 mol % of methylhydrogensiloxane units: $(CH_3)HSiO_{2/2}$.
viscosity at 25° C.=0.04 Pa·s
SiH content=1.5 mol/100 g C-2 cyclic organohydrogenpolysiloxane consisting of 100 mol % of methylhydrogensiloxane units: $(CH_3)HSiO_{2/2}$.
viscosity at 25° C.=0.005 Pa·s
SiH content=1.7 mol/100 g C-3 linear organohydrogenpolysiloxane consisting of 5 mol % of dimethylhydrogensiloxane units: $(CH_3)_2HSiO_{1/2}$, 70 mol % of methylhydrogensiloxane units: $(CH_3)HSiO_{2/2}$ and 25 mol % of dimethylsiloxane units: $(CH_3)_2SiO_{2/2}$.
viscosity at 25° C.=0.04 Pa·s
SiH content=1.2 mol/100 g C-4 branched organohydrogenpolysiloxane consisting of 50 mol % of dimethylhydrogensiloxane units: $(CH_3)_2HSiO_{1/2}$, and 50 mol % of methylsiloxane units: $(CH_3)SiO_{3/2}$.
viscosity at 25° C.=0.01 Pa·s
SiH content=0.75 mol/100 g C-5 branched organohydrogenpolysiloxane consisting of 45 mol % of dimethylhydrogensiloxane units: $(CH_3)_2HSiO_{1/2}$, 10 mol % of dimethylsiloxane units: $(CH_3)_2SiO_{2/2}$, and 45 mol % of siloxane units: $SiO_4/2$.
viscosity at 25° C.=0.01 Pa·s
SiH content=0.75 mol/100 g C-6 linear organohydrogenpolysiloxane consisting of 2 mol % of dimethylhydrogensiloxane units: $(CH_3)_2HSiO_{1/2}$, 58 mol % of methylhydrogensiloxane units: $(CH_3)HSiO_{2/2}$, 20 mol % of dimethylsiloxane units: $(CH_3)_2SiO_{1/2}$, and 20 mol % of diphenylsiloxane units: $(C_6H_5)_2SiO_{2/2}$.
viscosity at 25° C.=0.5 Pa·s
SiH content=0.68 mol/100 g Component (D)
D-1 platinum-vinyl siloxane complex as catalyst Component (E)
E-1 solvent mixture of toluene and 2-butanone in a weight ratio of 1:1

Component (F)
F-1 linear organopolysiloxane blocked at both ends of molecular chain with dimethylhydroxylsilyl and having a backbone (exclusive of the end) consisting of 100 mol % of dimethylsiloxane units
viscosity at 25° C. of 30% toluene solution=40 Pa·s Component (G)
G-1 organopolysiloxane consisting of 50 mol % of $(CH_3)_2(CH_2=CH)SiO_{1/2}$ units and 50 mol % of $CH_3SiO_{3/2}$ units.
vinyl content=0.6 mol/100 g
viscosity at 25° C.=0.03 Pa·s Component (H)
H-1 epoxy-containing siloxane oligomer represented by the compositional formula: $(CH_3O)_a R^{Ep}{}_b SiO_{(4-a-b)/2}$ wherein $R^{Ep}$ is a group of the formula:

[Chemical Formula 42]

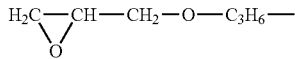

a=1.7, and b=1, having a number average DOP of 3 and a viscosity at 25° C. of 0.1 Pa·s.

Component (I)
I-1 organopolysiloxane consisting of 5 mol % of $(CH_2=CH)(CH_3)_2SiO_2$ units, 45 mol % of $(CH_3)_3SiO_{1/2}$ units, and 50 mol % of $SiO_{4/2}$ units.
vinyl content=0.07 mol/100 g I-2 organopolysiloxane consisting of 55 mol % of $(CH_3)_3SiO_{1/2}$ units and 45 mol % of $SiO_{4/2}$ units, and having a number average DOP of 70.

Component (J)
J-1 3-methyl-1-butyn-3-ol as bath life prolonger

Examples 1 to 19 and Comparative Examples 1 to 8

A coating composition (release agent) was prepared by the following procedure using the foregoing components (A) to (J) as starting materials.

Components (A) to (C) and components (E) to (J) were fed into a flask in accordance with the formulation in Table 1, and stirred and dissolved at 20-40° C. for 3 hours. Component (D) was added to the solution in an amount to give the weight of platinum shown in Table 1. The solution was stirred and mixed at 20-40° C. for 10 minutes, yielding the coating composition.

Using the coating composition, a coated article was prepared and evaluated by the procedures described below. Notably, the viscosity was measured at 25° C. using a viscometer model TVB-10 (Toki Sangyo Co., Ltd.).

<Evaluation>
[Curability]

The release agent was coated to a PET film of 38 μm thick by means of #5 bar coater and heated in a hot air dryer at 100° C. for a predetermined time (second) to form a release agent layer. The release agent layer was rubbed with the finger 10 strokes, after which it was visually observed for smear and rub-off and evaluated according to the following criterion.

A: no smear or rub-off at time of 10 seconds
B: smear and rub-off at time of 10 seconds, but not at 20 seconds
C: smear and rub-off at time of 20 seconds, but not at 30 seconds
D: smear and rub-off at time of 30 seconds, but not at 60 seconds
E: smear and rub-off at time of 60 seconds

[Adhesion]

The release agent was coated to a PET film of 38 μm thick by means of #5 bar coater and heated in a hot air dryer at 120° C. for 1 minute to form a release agent layer. The sample was stored at 25° C. and 50% RH for one week or at 60° C. and 90% RH for one week. The release agent layer was rubbed with the finger 10 strokes, after which it was visually observed for smear and rub-off and evaluated according to the following criterion.

A: no smear or rub-off after 60° C./90% RH/1 week
B: smear and rub-off after 60° C./90% RH/1 week, but not after 25° C./50% RH/1 week
C: smear and rub-off after 25° C./50% RH/1 week

[Residual Adhesion]

A release agent layer was formed as in the above adhesion test. A polyester PSA tape of 50 mm wide (Nitto 31B by Nitto Denko Corp.) was rested on the surface of the release agent layer. With a load of 1,976 Pa rested on the PSA tape, the assembly was heat treated at 70° C. for 20 hours to bond the polyester PSA tape to the release agent layer. Thereafter, the PSA tape was peeled from the release agent layer and in turn, attached to a stainless steel plate. Next, using a tensile tester, a release force X required to peel the PSA tape from the steel plate was measured.

Similarly, a polyester PSA tape was bonded to a polytetrafluoroethylene plate instead of the release agent layer and treated, after which a release force Y was measured.

A percent residual adhesion was computed from the formula:

(release force X/release force Y)×100(%).

A higher residual adhesion indicates that the release agent layer is good in release, and a lowering of bonding force of polyester PSA tape as a result of being bonded to the release agent layer is suppressed.

The rating is A for a residual adhesion of 95% or higher, B for 90% to less than 95%, and C for less than 90%.

[Migration]

A release agent layer was formed as in the above curability test. A PET film of 25 μm thick was laid on the surface of the release agent layer. The assembly was pressed at 25° C. for 20 hours under a load of 988 kPa. Thereafter, atmospheric pressure was resumed, and the PET film of 25 μm thick was peeled. The surface of the PET film which had been in contact with the release agent layer was uniformly coated with red marker ink and visually observed for cissing.

The rating is A for satisfaction without cissing, B for local cissing, and C for overall cissing.

[Release Force]

A release agent layer was formed as in the above adhesion test. Evaluation was made by the following procedure according to the FINAT test method.

A PSA tape of 25 mm wide (Tesa 7475 tape by Tesa Tape K.K.) was rested on the surface of the release agent layer. With a load of 1,976 Pa rested on the PSA tape, the assembly was heat treated at 70° C. for 20 hours to bond the PSA tape to the release agent layer. The assembly was allowed to stand at room temperature for 1 hour. Using a tensile tester, a release force was measured by peeling the PSA tape from the release agent layer at an angle of 180° and a peel rate of 0.3 m/min.

TABLE 1

|   | Composition component | Example 1 | Example 2 | Example 3 | Comparative Example 1 | Comparative Example 2 | Comparative Example 3 |
|---|---|---|---|---|---|---|---|
| (A) | A-1 (pbw) | 100.00 | 100.00 | 100.00 | 100.00 | 100.00 | 100.00 |
|   | A-2 (pbw) | | | | | | |
|   | A-3 (pbw) | | | | | | |
|   | A-4 (pbw) | | | | | | |
|   | A-5 (pbw) | | | | | | |
|   | Total of A (pbw) | 100.00 | 100.00 | 100.00 | 100.00 | 100.00 | 100.00 |
| (B) | B-1 (pbw) | 5.00 | 1.00 | 15.00 | 0.00 | 0.30 | 30.00 |
|   | B-2 (pbw) | | | | | | |
|   | B-3 (pbw) | | | | | | |
|   | B-4 (pbw) | | | | | | |
|   | B-5 (pbw) | | | | | | |
|   | B-6 (pbw) | | | | | | |
|   | B-7 (pbw) | | | | | | |
|   | Total of B (pbw) | 5.00 | 1.00 | 15.00 | 0.00 | 0.30 | 30.00 |
| (C) | C-1 (pbw) | 2.10 | 1.92 | 3.17 | 2.00 | 1.94 | 5.67 |
|   | C-2 (pbw) | | | | | | |
|   | C-3 (pbw) | | | | | | |
|   | C-4 (pbw) | | | | | | |
|   | C-5 (pbw) | | | | | | |
|   | C-6 (pbw) | | | | | | |
|   | Total of C (pbw) | 2.10 | 1.92 | 3.17 | 2.00 | 1.94 | 5.67 |
| (D) | D-1 (pbw) | 0.02 | 0.02 | 0.02 | 0.02 | 0.02 | 0.02 |
| (E) | E-1 (pbw) | 3462.90 | 3327.64 | 3820.72 | 3298.00 | 3305.60 | 4386.56 |
| (F) | F-1 (pbw) | | | | | | |
| (G) | G-1 (pbw) | | | | | | |
| (H) | H-1 (pbw) | | | | | | |
| (I) | I-1 (pbw) | | | | | | |
|   | I-2 (pbw) | | | | | | |
|   | Total of I (pbw) | | | | | | |
| (J) | J-1 (pbw) | 1.07 | 1.03 | 1.18 | 1.02 | 1.02 | 1.36 |
| Total | Total of composition (pbw) | 3571.09 | 3431.60 | 3940.09 | 3401.04 | 3408.87 | 4523.60 |
|   | Total of Vi (mol/100 g) | 0.02 | 0.01 | 0.05 | 0.01 | 0.01 | 0.09 |
|   | Vi A + B (mol/100 g) | 0.02 | 0.01 | 0.05 | 0.01 | 0.01 | 0.09 |
|   | Total of H (mol/100 g) | 0.03 | 0.03 | 0.05 | 0.03 | 0.03 | 0.09 |
|   | H/Vi A + B (mol/mol) | 1.40 | 2.30 | 1.00 | 3.00 | 2.70 | 1.00 |
|   | Total of H/Vi (mol/mol) | 1.40 | 2.30 | 1.00 | 3.00 | 2.70 | 1.00 |
|   | Total of Sx[*1] (pbw) | 107.10 | 102.92 | 118.17 | 102.00 | 102.24 | 135.67 |
|   | Sx[*1] A + B + C (pbw) | 107.10 | 102.92 | 118.17 | 102.00 | 102.24 | 135.67 |
| Evaluation | Curability | A | B | B | D | D | D |
|   | Adhesion | A | A | A | B | A | B |
|   | Residual adhesion | A | A | A | A | A | A |
|   | Migration | A | A | A | A | A | A |
|   | Release force (N) | 0.13 | 0.15 | 0.11 | 0.30 | 0.28 | 0.13 |

[*1]Sx designates organosilicon compounds (the same holds true, hereinafter)

TABLE 2

|   | Composition component | Example 4 | Example 5 | Comparative Example 4 | Comparative Example 5 | Example 6 | Example 7 |
|---|---|---|---|---|---|---|---|
| (A) | A-1 (pbw) | 100.00 | 100.00 | 100.00 | 100.00 | 100.00 | 100.00 |
|   | A-2 (pbw) | | | | | | |
|   | A-3 (pbw) | | | | | | |
|   | A-4 (pbw) | | | | | | |
|   | A-5 (pbw) | | | | | | |
|   | Total of A (pbw) | 100.00 | 100.00 | 100.00 | 100.00 | 100.00 | 100.00 |
| (B) | B-1 (pbw) | | | | | | |
|   | B-2 (pbw) | 3.00 | | | | 5.00 | |
|   | B-3 (pbw) | | 15.00 | | | | 1.00 |
|   | B-4 (pbw) | | | 3.00 | | | |
|   | B-5 (pbw) | | | | 15.00 | | |
|   | B-6 (pbw) | | | | | | |
|   | B-7 (pbw) | | | | | | |
|   | Total of B (pbw) | 3.00 | 15.00 | 3.00 | 15.00 | 5.00 | 1.00 |
| (C) | C-1 (pbw) | 2.05 | 1.69 | 2.33 | 1.55 | 1.20 | 6.11 |
|   | C-2 (pbw) | | | | | | |
|   | C-3 (pbw) | | | | | | |
|   | C-4 (pbw) | | | | | | |
|   | C-5 (pbw) | | | | | | |
|   | C-6 (pbw) | | | | | | |
|   | Total of C (pbw) | 2.05 | 1.69 | 2.33 | 1.55 | 1.20 | 6.11 |
| (D) | D-1 (pbw) | 0.016 | 0.018 | 0.016 | 0.017 | 0.016 | 0.016 |
| (E) | E-1 (pbw) | 3396.72 | 3773.08 | 3405.78 | 3768.56 | 3433.80 | 3463.16 |
| (F) | F-1 (pbw) | | | | | | |
| (G) | G-1 (pbw) | | | | | | |
| (H) | H-1 (pbw) | | | | | | |
| (I) | I-1 (pbw) | | | | | | |
|   | I-2 (pbw) | | | | | | |
|   | Total of I (pbw) | | | | | | |
| (J) | J-1 (pbw) | 1.05 | 1.17 | 1.05 | 1.17 | 1.06 | 1.07 |
| Total | Total of composition (pbw) | 3502.84 | 3890.96 | 3512.18 | 3886.29 | 3541.08 | 3571.35 |
|   | Total of Vi (mol/100 g) | 0.02 | 0.01 | 0.03 | 0.01 | 0.03 | 0.01 |
|   | Vi A + B (mol/100 g) | 0.02 | 0.01 | 0.03 | 0.01 | 0.03 | 0.01 |
|   | Total of H (mol/100 g) | 0.03 | 0.03 | 0.04 | 0.02 | 0.02 | 0.09 |
|   | H/Vi A + B (mol/mol) | 1.40 | 2.00 | 1.40 | 2.00 | 0.60 | 9.00 |
|   | Total of H/Vi (mol/mol) | 1.40 | 2.00 | 1.40 | 2.00 | 0.60 | 9.00 |
|   | Total of Sx (pbw) | 105.05 | 116.69 | 105.33 | 116.55 | 106.20 | 107.11 |
|   | Sx A + B + C (pbw) | 105.05 | 116.69 | 105.33 | 116.55 | 106.20 | 107.11 |
| Evaluation | Curability | B | C | C | D | B | B |
|   | Adhesion | A | A | A | A | A | A |
|   | Residual adhesion | A | A | A | A | A | A |
|   | Migration | A | A | A | A | A | A |
|   | Release force (N) | 0.13 | 0.23 | 0.34 | 0.30 | 0.09 | 0.22 |

TABLE 3

|   | Composition component | Comparative Example 6 | Comparative Example 7 | Example 8 | Example 9 | Example 10 | Example 11 |
|---|---|---|---|---|---|---|---|
| (A) | A-1 (pbw) | 100.00 | 100.00 | | | | |
|   | A-2 (pbw) | | | 100.00 | 100.00 | | |
|   | A-3 (pbw) | | | | | 100.00 | |
|   | A-4 (pbw) | | | | | | 100.00 |
|   | A-5 (pbw) | | | | | | |
|   | Total of A (pbw) | 100.00 | 100.00 | 100.00 | 100.00 | 100.00 | 100.00 |
| (B) | B-1 (pbw) | | | 5.00 | 5.00 | 5.00 | 5.00 |
|   | B-2 (pbw) | 5.00 | | | | | |
|   | B-3 (pbw) | | 1.00 | | | | |
|   | B-4 (pbw) | | | | | | |
|   | B-5 (pbw) | | | | | | |
|   | B-6 (pbw) | | | | | | |
|   | B-7 (pbw) | | | | | | |
|   | Total of B (pbw) | 5.00 | 1.00 | 5.00 | 5.00 | 5.00 | 5.00 |
| (C) | C-1 (pbw) | 0.60 | 10.18 | | | 1.26 | 1.35 |
|   | C-2 (pbw) | | | | 0.53 | | |
|   | C-3 (pbw) | | | 2.25 | 1.50 | | |
|   | C-4 (pbw) | | | | | | |
|   | C-5 (pbw) | | | | | | |
|   | C-6 (pbw) | | | | | | 1.32 |
|   | Total of C (pbw) | 0.60 | 10.18 | 2.25 | 2.03 | 1.26 | 2.67 |

TABLE 3-continued

|  | Composition component | Comparative Example | | Example | | | |
|---|---|---|---|---|---|---|---|
|  |  | 6 | 7 | 8 | 9 | 10 | 11 |
| (D) | D-1 (pbw) | 0.016 | 0.017 | 0.016 | 0.016 | 0.016 | 0.016 |
| (E) | E-1 (pbw) | 3414.40 | 3594.82 | 3467.75 | 3460.62 | 3435.63 | 3481.44 |
| (F) | F-1 (pbw) |  |  |  |  |  |  |
| (G) | G-1 (pbw) |  |  |  |  |  |  |
| (H) | H-1 (pbw) |  |  |  |  |  |  |
| (I) | I-1 (pbw) |  |  |  |  |  |  |
|  | I-2 (pbw) |  |  |  |  |  |  |
|  | Total of I (pbw) |  |  |  |  |  |  |
| (J) | J-1 (pbw) | 1.06 | 1.11 | 1.07 | 1.07 | 1.06 | 1.08 |
| Total | Total of composition (pbw) | 3521.07 | 3707.13 | 3576.09 | 3568.73 | 3542.97 | 3590.21 |
|  | Total of Vi (mol/100 g) | 0.03 | 0.01 | 0.02 | 0.02 | 0.01 | 0.02 |
|  | Vi A + B (mol/100 g) | 0.03 | 0.01 | 0.02 | 0.02 | 0.01 | 0.02 |
|  | Total of H (mol/100 g) | 0.01 | 0.15 | 0.03 | 0.03 | 0.02 | 0.03 |
|  | H/Vi A + B (mol/mol) | 0.30 | 15.00 | 1.20 | 1.20 | 1.30 | 1.30 |
|  | Total of H/Vi (mol/mol) | 0.30 | 15.00 | 1.20 | 1.20 | 1.30 | 1.30 |
|  | Total of Sx (pbw) | 105.60 | 111.18 | 107.25 | 107.03 | 106.26 | 107.67 |
|  | Sx A + B + C (pbw) | 105.60 | 111.18 | 107.25 | 107.03 | 106.26 | 107.67 |
| Evaluation | Curability | C | B | A | B | A | B |
|  | Adhesion | B | A | A | A | A | A |
|  | Residual adhesion | B | A | A | A | A | A |
|  | Migration | B | A | A | A | A | A |
|  | Release force (N) | 0.09 | 0.35 | 0.14 | 0.14 | 0.1 | 0.2 |

TABLE 4

|  | Composition component | Example | | | | | |
|---|---|---|---|---|---|---|---|
|  |  | 12 | 13 | 14 | 15 | 16 | 17 |
| (A) | A-1 (pbw) |  | 100.00 | 100.00 | 100.00 | 100.00 | 100.00 |
|  | A-2 (pbw) |  |  |  |  |  |  |
|  | A-3 (pbw) | 100.00 |  |  |  |  |  |
|  | A-4 (pbw) |  |  |  |  |  |  |
|  | A-5 (pbw) |  |  |  |  |  |  |
|  | Total of A (pbw) | 100.00 | 100.00 | 100.00 | 100.00 | 100.00 | 100.00 |
| (B) | B-1 (pbw) | 5.00 | 5.00 | 5.00 | 5.00 | 5.00 |  |
|  | B-2 (pbw) |  |  |  |  |  |  |
|  | B-3 (pbw) |  |  |  |  |  |  |
|  | B-4 (pbw) |  |  |  |  |  |  |
|  | B-5 (pbw) |  |  |  |  |  |  |
|  | B-6 (pbw) |  |  |  |  |  | 5.00 |
|  | B-7 (pbw) |  |  |  |  |  |  |
|  | Total of B (pbw) | 5.00 | 5.00 | 5.00 | 5.00 | 5.00 | 5.00 |
| (C) | C-1 (pbw) |  | 3.75 | 2.10 | 3.00 | 3.00 | 2.50 |
|  | C-2 (pbw) |  |  |  |  |  |  |
|  | C-3 (pbw) | 1.21 |  |  |  |  |  |
|  | C-4 (pbw) | 0.58 |  |  |  |  |  |
|  | C-5 (pbw) |  |  |  |  |  |  |
|  | C-6 (pbw) |  |  |  |  |  |  |
|  | Total of C (pbw) | 1.79 | 3.75 | 2.10 | 3.00 | 3.00 | 2.50 |
| (D) | D-1 (pbw) | 0.016 | 0.017 | 0.017 | 0.018 | 0.017 | 0.016 |
| (E) | E-1 (pbw) | 3485.16 | 3677.92 | 3559.90 | 3815.33 | 3653.67 | 3475.83 |
| (F) | F-1 (pbw) | 1.00 |  |  |  |  |  |
| (G) | G-1 (pbw) |  | 5.00 |  |  |  |  |
| (H) | H-1 (pbw) |  |  | 3.00 |  |  |  |
| (I) | I-1 (pbw) |  |  |  | 10.00 |  |  |
|  | I-2 (pbw) |  |  |  |  | 5.00 |  |
|  | Total of I (pbw) |  |  |  | 10.00 | 5.00 |  |
| (J) | J-1 (pbw) | 1.08 | 1.14 | 1.10 | 1.18 | 1.13 | 1.08 |
| Total | Total of composition (pbw) | 3594.04 | 3792.82 | 3671.12 | 3934.53 | 3767.81 | 3584.42 |
|  | Total of Vi (mol/100 g) | 0.01 | 0.05 | 0.02 | 0.03 | 0.02 | 0.03 |
|  | Vi A + B (mol/100 g) | 0.01 | 0.02 | 0.02 | 0.02 | 0.02 | 0.03 |
|  | Total of H (mol/100 g) | 0.02 | 0.06 | 0.03 | 0.05 | 0.05 | 0.04 |
|  | H/Vi A + B (mol/mol) | 1.30 | 2.50 | 1.40 | 2.00 | 2.00 | 1.50 |
|  | Total of H/Vi (mol/mol) | 1.30 | 1.07 | 1.40 | 1.53 | 2.00 | 1.50 |
|  | Total of Sx (pbw) | 107.79 | 113.75 | 110.10 | 118.00 | 113.00 | 107.50 |
|  | Sx A + B + C (pbw) | 106.79 | 108.75 | 107.10 | 108.00 | 108.00 | 107.50 |
| Evaluation | Curability | B | A | A | B | B | A |
|  | Adhesion | A | A | A | A | A | A |
|  | Residual adhesion | A | A | A | A | A | A |
|  | Migration | A | A | A | A | A | A |
|  | Release force (N) | 0.09 | 0.33 | 0.15 | 0.51 | 0.43 | 0.15 |

TABLE 5

| Composition component | | Example 18 | Example 19 | Comparative Example 8 |
|---|---|---|---|---|
| (A) | A-1 (pbw) | | | 100.00 |
| | A-2 (pbw) | | | |
| | A-3 (pbw) | | 100.00 | |
| | A-4 (pbw) | | | |
| | A-5 (pbw) | 100.00 | | |
| | Total of A (pbw) | 100.00 | 100.00 | 100.00 |
| (B) | B-1 (pbw) | | 5.00 | |
| | B-2 (pbw) | | | |
| | B-3 (pbw) | 5.00 | | |
| | B-4 (pbw) | | | |
| | B-5 (pbw) | | | |
| | B-6 (pbw) | | | |
| | B-7 (pbw) | | | 5.00 |
| | Total of B (pbw) | 5.00 | 5.00 | 5.00 |
| (C) | C-1 (pbw) | 1.81 | | 5.2 |
| | C-2 (pbw) | | | |
| | C-3 (pbw) | | | |
| | C-4 (pbw) | | 1.93 | |
| | C-5 (pbw) | | 0.58 | |
| | C-6 (pbw) | | | |
| | Total of C (pbw) | 1.81 | 2.51 | 5.20 |
| (D) | D-1 (pbw) | 0.001 | 0.016 | 0.016 |
| (E) | E-1 (pbw) | 220.23 | 3476.26 | 3563.13 |
| (F) | F-1 (pbw) | | | |
| (G) | G-1 (pbw) | | | |
| (H) | H-1 (pbw) | | | |
| (I) | I-1 (pbw) | | | |
| | I-2 (pbw) | | | |
| | Total of I (pbw) | | | |
| (J) | J-1 (pbw) | 0.07 | 1.08 | 1.10 |
| Total | Total of composition (pbw) | 327.11 | 3584.87 | 3674.45 |
| | Total of Vi (mol/100 g) | 0.02 | 0.01 | 0.07 |
| | Vi A + B (mol/100 g) | 0.02 | 0.01 | 0.07 |
| | Total of H (mol/100 g) | 0.03 | 0.02 | 0.08 |
| | H/Vi A + B (mol/mol) | 1.30 | 1.30 | 1.20 |
| | Total of H/Vi (mol/mol) | 1.30 | 1.30 | 1.20 |
| | Total of Sx (pbw) | 106.81 | 107.51 | 110.20 |
| | Sx A + B + C (pbw) | 106.81 | 107.51 | 110.20 |
| Evaluation | Curability | B | A | D |
| | Adhesion | B | A | B |
| | Residual adhesion | A | A | B |
| | Migration | A | A | B |
| | Release force (N) | 0.23 | 0.26 | 0.42 |

The invention claimed is:

1. A curable silicone composition of addition cure type for release paper or release film comprising:

(A) 100 parts by weight of an organopolysiloxane containing at least two alkenyl groups per molecule, represented by the general formula (1):

[Chemical Formula 1]

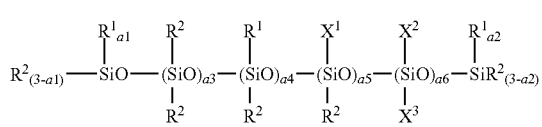

(1)

wherein $R^1$ is independently an alkenyl group, $R^2$ is independently an unsubstituted or halo- or cyano-substituted monovalent hydrocarbon group free of aliphatic unsaturation, $X^1$ is independently a group of the general formula (2-1), $X^2$ is independently a group of the general formula (2-2), $X^3$ is independently a group of the general formula (2-3),

[Chemical Formula 2]

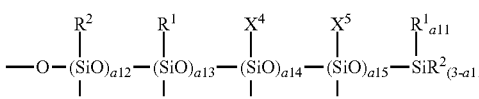

(2-1)

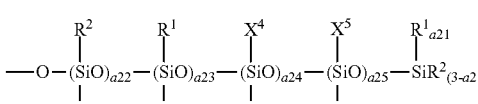

(2-2)

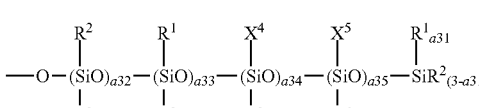

(2-3)

$X^4$ is independently a group of the general formula (3-1), $X^5$ is independently a group of the general formula (3-2), $X^6$ is independently a group of the general formula (3-3),

[Chemical Formula 3]

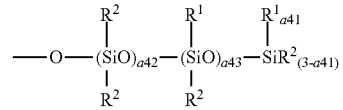

(3-1)

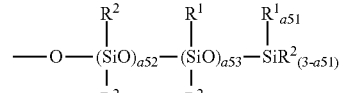

(3-2)

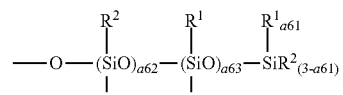

(3-3)

wherein $R^1$ and $R^2$ are as defined above, a1 and a2 each are an integer of 1 to 3, a11, a21, a31, a41, a51, and a61 each are an integer of 0 to 3; a3 is a positive number, a4 to a6, a12 to a15, a22 to a25, a32 to a35, a42, a43, a52, a53, a62 and a63 each are 0 or a positive number, and are selected such that the organopolysiloxane may have a 30 wt % toluene dilution viscosity in the range of 0.01 to 70 Pa·s at 25° C., (B) 0.5 to 20 parts by weight of an organopolysiloxane containing at least two alkenyl groups per molecule, represented by the general formula (4):

[Chemical Formula 4]

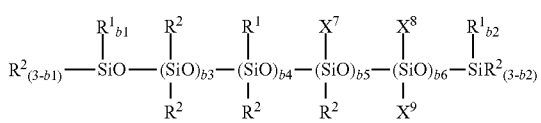

(4)

wherein $R^1$ is independently an alkenyl group, $R^2$ is independently an unsubstituted or halo- or cyano-substituted monovalent hydrocarbon group free of aliphatic unsaturation, $X^7$ is independently a group of the general formula (5-1), $X^8$ is independently a group of the general formula (5-2), $X^9$ is independently a group of the general formula (5-3),

[Chemical Formula 5]

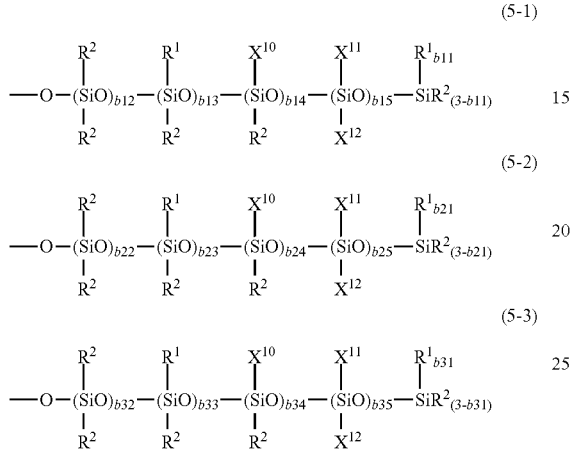

$X^{10}$ is independently a group of the general formula (6-1), $X^{11}$ is independently a group of the general formula (6-2), $X^{12}$ is independently a group of the general formula (6-3),

[Chemical Formula 6]

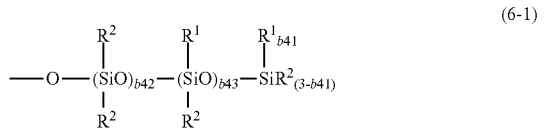

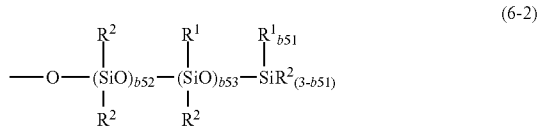

wherein $R^1$ and $R^2$ are as defined above, b1 and b2 each are an integer of 1 to 3, b11, b21, b31, b41, b51, and b61 each are an integer of 0 to 3; b3 is a positive number, b4 to b6, b12 to b15, b22 to b25, b32 to b35, b42, b43, b52, b53, b62, and b63 each are 0 or a positive number, and are selected such that the organopolysiloxane may have a viscosity at 25° C. in the range of 0.005 to less than 1 Pa·s or a 30 wt % toluene dilution viscosity of less than 0.01 Pa·s, and at least four siloxane units not having a silicon-bonded alkenyl group intervene between two siloxane units having a silicon-bonded alkenyl group, (C) an organohydrogenpolysiloxane containing at least two silicon-bonded hydrogen atoms per molecule, represented by the average compositional formula (7), in such an amount that the moles of silicon-bonded hydrogen atoms in component (C) is 0.5 to 10 times the total moles of alkenyl groups and unsaturated groups in components (A) and (B), $$R^2{}_{c1}H_{c2}SiO_{(4-c1-c2)/2} \qquad (7)$$

wherein $R^2$ is independently an unsubstituted or halo- or cyano-substituted monovalent hydrocarbon group free of aliphatic unsaturation, c1 is a positive number of 0.1 to 2, c2 is a positive number of 0.1 to 3, c1+c2 is a positive number of 1 to 3, and selected such that the organohydrogenpolysiloxane may contain at least two silicon-bonded hydrogen atoms per molecule and have a viscosity at 25° C. in the range of 0.005 to 10 Pa·s, (D) a catalytic amount of a platinum group metal base catalyst, and (E) 0 to 100,000 parts by weight of an organic solvent.

2. The silicone composition of claim 1 wherein component (C) is an organohydrogenpolysiloxane represented by the general formula (8) and/or (9):

[Chemical Formula 7]

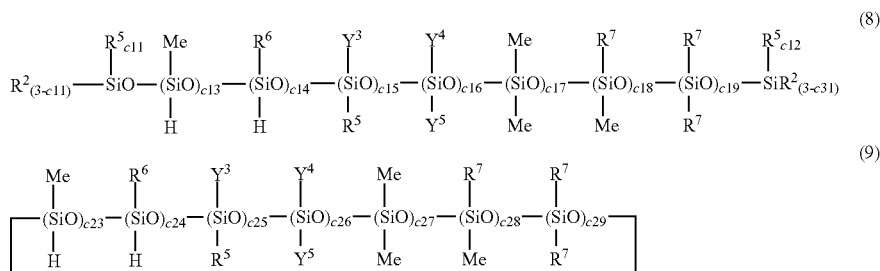

wherein Me is methyl, $R^2$ is independently an unsubstituted or halo- or cyano-substituted monovalent hydrocarbon group free of aliphatic unsaturation, $R^5$ is independently hydrogen or an unsubstituted or halo- or cyano-substituted monovalent hydrocarbon group free of aliphatic unsaturation, $R^6$ and $R^7$ each are an unsubstituted or halo- or cyano-substituted monovalent hydrocarbon group free of aliphatic unsaturation, exclusive of Me, $Y^3$ is independently a group of the general formula (10-1), Y⁴ is independently a group of the general formula (10-2), Y⁵ is independently a group of the general formula (10-3), drogenpolysiloxane containing an aromatic substituent wherein a weight ratio (C1)/(C2) of component (C1) to component (C2) is from 1/9 to 9/1.

[Chemical Formula 8]

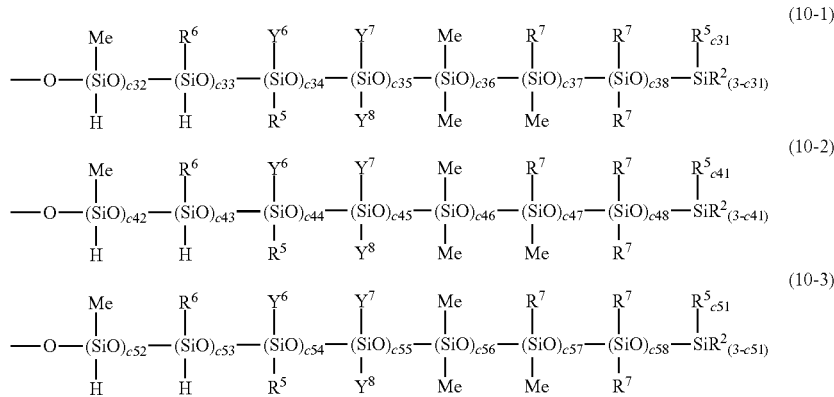

$Y^6$ is independently a group of the general formula (11-1),
$Y^7$ is independently a group of the general formula (11-2),
$Y^8$ is independently a group of the general formula (11-3),

[Chemical Formula 9]

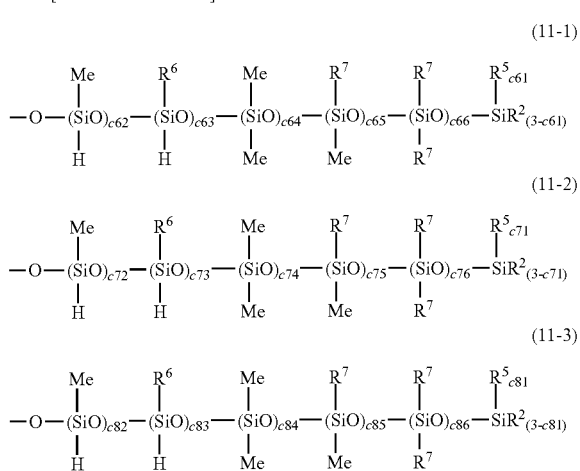

wherein $R^5$, $R^6$ and $R^7$ are as defined above, c11, c12, c31, c41, c51, c61, c71, and c81 each are an integer of 0 to 3, c23 is an integer of at least 2, c13 to c19, c24 to c29, c32 to c38, c42 to c48, c52 to c58, c62 to c66, c72 to c76, and c82 to c86 each are an integer of at least 0, c23+c24+c25+c26+c27+c28+c29 is an integer of at least 3, and are selected such that the organohydrogenpolysiloxane may contain at least three silicon-bonded hydrogen atoms per molecule and have a viscosity at 25° C. in the range of 0.005 to 10 Pa·s.

3. The silicone composition of claim 1 or 2 wherein component (C) is an organohydrogenpolysiloxane containing per molecule at least two $R^2{}_2HSiO_{1/2}$ units wherein $R^2$ is an unsubstituted or halo- or cyano-substituted monovalent hydrocarbon group free of aliphatic unsaturation, or a mixture partially containing the organohydrogenpolysiloxane.

4. The silicone composition of claim 1 wherein component (C) is a mixture of (C1) an organohydrogenpolysiloxane free of an aromatic substituent and (C2) an organohy- 5. The silicone composition of claim 1, further comprising (F) 0.1 to 30 parts by weight per 100 parts by weight of component (A) of an organopolysiloxane having the general formula (12):

[Chemical Formula 10]

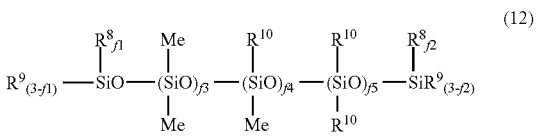

wherein Me is methyl, $R^8$ is independently a hydroxyl, alkoxy or alkoxyalkyl group, $R^9$ is independently a hydroxyl group, alkoxy group, alkoxyalkyl group, or unsubstituted or halo- or cyano-substituted monovalent hydrocarbon group free of aliphatic unsaturation, $R^{10}$ is independently a hydroxyl group, alkoxy group, alkoxyalkyl group, or unsubstituted or halo- or cyano-substituted monovalent hydrocarbon group free of aliphatic unsaturation, exclusive of Me, f1 and f2 each are an integer of 1 to 3, f3 to f5 are such integers that the organopolysiloxane may have a viscosity at 25° C. in the range of at least 1 Pa·s and a 30 wt % toluene dilution viscosity of up to 100 Pa·s.

6. The silicone composition of claim 1, further comprising (G) 5 to 100 parts by weight per 100 parts by weight of component (A) of an organopolysiloxane having at least two alkenyl groups, essentially comprising $R^2{}_{(3-g1)}R^1{}_{g1}SiO_{1/2}$ siloxane units ($M^{R1R2}$ units) and $R^2SiO_{3/2}$ siloxane units ($T^{R2}$ units) wherein $R^1$ is independently alkenyl, $R^2$ is independently an unsubstituted or halo- or cyano-substituted monovalent hydrocarbon group free of aliphatic unsaturation, and g1 is an integer of 1 to 3, wherein a molar ratio of $M^{R1R2}$ units to $T^{R2}$ units is from 2/8 to 8/2, having a viscosity at 25° C. in the range of 0.001 to 1 Pa·s, and terminated with $M^{R1R2}$ units, or $M^{R1R2}$ units and some silanol or alkoxy groups.

7. The silicone composition of claim 1, further comprising (H) 0.1 to 10 parts by weight per 100 parts by weight of component (A) of an organosilane having at least epoxy and alkoxysilyl groups per molecule, represented by the general formula (13) and/or a partial hydrolytic (co)condensation siloxane thereof, represented by the average compositional formula (14), $$R^{11}_{h1}(OR^{12})_{h2}Si(R^{13})_{(4-h1-h2)} \qquad (13)$$

$$R^{11}_{h3}(OR^{12})_{h4}(R^{13})_{h5}SiO_{(4-h3-h4-h5)/2} \qquad (14)$$

wherein $R^{11}$ is an epoxy-containing monovalent organic group, $R^{12}$ is a $C_1$-$C_6$ alkyl group which may contain an ether bond, and which may be partially hydrolyzed into a hydroxyl group, $R^{13}$ is an unsubstituted or halo- or cyano-substituted monovalent hydrocarbon group, h1 and h2 are integers in the range: 1≤h1, 1≤h2, 2≤h1+h2≤4, h3 to h5 are positive numbers in the range: 0<h3, 0<h4, 0 h5, 1<h3+h4+h5≤3, and are selected such that the partial hydrolytic (co)condensation siloxane may have a viscosity at 25° C. in the range of 0.001 to 1 Pa·s.

8. The silicone composition of claim 1, further comprising (I) 1 to 100 parts by weight per 100 parts by weight of component (A) of a MQ resin consisting of siloxane units (M units) having the general formula (15) and siloxane units (Q units) having the general formula (16) wherein a molar ratio of M units to Q units is from 2/8 to 8/2, $$R^{2}_{(3-i1)}R^{1}_{i1}SiO_{1/2} \qquad (15)$$

$$SiO_{4/2} \qquad (16)$$

wherein $R^1$ is independently an alkenyl group, $R^2$ is independently an unsubstituted or halo- or cyano-substituted monovalent hydrocarbon group free of aliphatic unsaturation, and i1 is an integer of 0 to 3.

9. A release paper or release film obtained by coating and curing the addition reaction-curable silicone composition of claim 1 or 2 to a paper or film substrate.

* * * * *